(12) United States Patent
Moore et al.

(10) Patent No.: US 8,638,061 B2
(45) Date of Patent: *Jan. 28, 2014

(54) HYBRID ENERGY STORAGE SYSTEM, RENEWABLE ENERGY SYSTEM INCLUDING THE STORAGE SYSTEM, AND METHOD OF USING SAME

(71) Applicant: Eaglepicher Technologies, LLC, Joplin, MO (US)

(72) Inventors: Randy Moore, Joplin, MO (US); Ron Nowlin, Riverton, KS (US); Viet Vu, Canton, MI (US); Michael Parrot, Joplin, MO (US); Jeff Dermott, Carthage, MO (US); Gregory Miller, Diamond, MO (US); Kevin E. Ames, Webb City, MO (US); Charles W. Huddleston, Joplin, MO (US)

(73) Assignee: Eaglepicher Technologies, LLC, Joplin ( * ) Notice: Subject to any disclaimer, the term of this patent is extended or adjusted under 35 U.S.C. 154(b) by 0 days.

This patent is subject to a terminal disclaimer.

(21) Appl. No.: 13/836,809

(22) Filed: Mar. 15, 2013

(65) Prior Publication Data

US 2013/0211616 A1 Aug. 15, 2013

Related U.S. Application Data

(63) Continuation of application No. 12/752,675, filed on Apr. 1, 2010, now Pat. No. 8,427,098.

(60) Provisional application No. 61/165,851, filed on Apr. 1, 2009.

(51) Int. Cl.
*H02J 7/00* (2006.01)

(52) U.S. Cl.
USPC ............ 320/103; 320/107; 320/101; 307/87; 307/64; 307/66

(58) Field of Classification Search
USPC ........................................ 320/103
See application file for complete search history.

(56) References Cited

U.S. PATENT DOCUMENTS

| 8,427,098 | B2 | 4/2013 | Moore et al. | |
| 2003/0072977 | A1* | 4/2003 | Speranza et al. | 429/9 |

(Continued)

FOREIGN PATENT DOCUMENTS

| EP | 1 528 652 | 5/2005 |
| FR | 2879852 | 6/2006 |

(Continued)

OTHER PUBLICATIONS

Apr. 9, 2013 Office Action issued in Japanese Patent Application No. 2012-503706 (with translation).

(Continued)

*Primary Examiner* — Yalkew Fantu
(74) *Attorney, Agent, or Firm* — Oliff & Berridge, PLC

(57) ABSTRACT

This disclosure generally relates to stabilizing energy provided by an energy source, and more particularly to systems and methods for using multiple types of energy storage devices to selectively capture and provide energy. An energy source provides energy, and the energy storage devices selectively capture energy provided by the energy source in excess of an immediate energy requirement of a load and selectively provide energy when the immediate energy requirement of the load exceeds the energy provided by the energy source.

20 Claims, 15 Drawing Sheets

(56) References Cited

U.S. PATENT DOCUMENTS

2007/0096564 A1* 5/2007 Maeda .................... 307/87
2008/0138680 A1* 6/2008 Hu et al. .................. 429/23
2008/0185989 A1* 8/2008 Stenroos et al. ......... 320/101
2008/0277173 A1   11/2008 Midrouillet et al.

FOREIGN PATENT DOCUMENTS

| JP | A-2005-160290 | 6/2005 |
| JP | A-2008-148443 | 6/2008 |
| JP | A-2009-512416 | 3/2009 |
| WO | WO 2004/114433 | 12/2004 |
| WO | WO 2006/067350 A1 | 6/2006 |
| WO | WO 2008/031640 | 3/2008 |

OTHER PUBLICATIONS

Nov. 9, 2012 Office Action issued in Russian Patent Application No. 2011141193/07 (with English translation).
Unknown, "Battery/2000 TM 2M-1630," available at http:ww.battery2000.com/2m1630.htm, 1 page, printed on Jul. 21, 2010.
Aug. 18, 2010 International Search Report and Written Opinion issued in Application No. PCT/US2010/029643.
Jul. 18, 2012 Office Action issued in U.S. Appl. No. 12/752,675.
Jan. 18, 2013 Notice of Allowance issued in U.S. Appl. No. 12/752,675.

* cited by examiner

HYBRID ENERGY STORAGE SYSTEM, RENEWABLE ENERGY SYSTEM INCLUDING THE STORAGE SYSTEM, AND METHOD OF USING SAME

CROSS-REFERENCE TO RELATED APPLICATIONS

This is a continuation of U.S. patent application No. 12/752,675 filed Apr. 1, 2010, which claims priority to U.S. Provisional Patent Application No. 61/165,851 filed Apr. 1, 2009. The disclosure of prior applications are hereby incorporated by reference herein its entirety.

FIELD

This disclosure generally relates to systems and methods for stabilizing energy provided by an energy source, and more particularly to systems and methods for using multiple types of energy storage devices to selectively capture and provide energy supplied by energy sources, including renewable and nonrenewable energy sources.

BACKGROUND OF THE INVENTION

As the world's population increases, consumer demand for electrical energy also increases. Fossil fuels (e.g., coal, oil, and natural gas) have been used as an energy source in electrical power plants for many years. Burning fossil fuels generates air pollutants such as carbon dioxide. These emissions may have a negative effect on the environment and may contribute to climate change. Further, to reduce air pollutants, some countries have passed laws that limit allowable air pollutants. These laws generally increase the cost of generating electrical energy from fossil fuels. Fossil fuel deposits around the world are being depleted because they are not being replenished at a rate commensurate with consumption. Access to fossil fuels is also often dependent on world political and economic conditions. These factors combine to cause increasing and unstable prices for energy generated from fossil fuels.

One solution to the problems of pollution from energy production via fossil fuels, diminishing fossil fuel deposits, increasing fossil fuel prices, fossil fuel price volatility, and government regulation is to use other energy sources, such as renewable energy sources, to generate electrical energy. Renewable energy sources such as wind, solar (e.g., photovoltaic), and geothermal are now available on a commercial basis, and the cost of electricity produced using these methods is generally decreasing as they become more prevalent and the underlying technologies are refined. Renewable energy sources thus provide potential solutions to the cost, availability, and environmental concerns associated with use of fossil fuels for electrical energy production.

One drawback associated with renewable energy sources is that their energy production may be affected by factors beyond the control of any operator such as darkness, lack of wind, or weather. For example, the sun does not shine all day every day, and the wind does not blow steadily all day every day. Therefore, solar cells and wind turbines cannot produce a steady energy output all day every day. However, it is desirable to achieve a relatively steady power output from these energy sources. Conversely, energy sources powered by fossil fuels such as gas turbine generators have a peak efficiency achieved at an output level determined by the design of the generator such that it is desirable to operate the generator at a specific output level associated with peak efficiency. However, as described above, energy demand may vary significantly. In each of these scenarios, a system for augmenting power provided by the energy source to the load is desirable.

SUMMARY

The present disclosure is directed to a method of stabilizing power provided by an energy source to a load. A first energy storage device captures energy produced by the energy source in excess of an immediate energy requirement of the load unless an energy level of the first energy storage device is at a first maximum threshold. A second energy storage device captures energy produced by the energy source in excess of the immediate energy requirement of the load if the energy level of the first energy storage device is at the first maximum threshold, unless an energy level of the second energy storage device is at a second maximum threshold. In one embodiment, another aspect of stabilizing power provided by the energy source to the load includes providing energy from the first energy storage device to the load when the immediate energy requirement of the load exceeds the energy produced by the energy source unless the energy level of the first energy storage device is at a first minimum threshold. If the energy level of the first energy storage device is at the first minimum threshold and the immediate energy requirement of the load exceeds the energy produced by the energy source, the second energy storage device provides energy to the load unless the energy level of the second energy storage device is at a second minimum threshold.

The disclosure is further directed to a system for providing power to a load. The system includes an energy source, a first energy storage device, a second energy storage device, and an energy flow controller. The energy source provides power and the first and second energy storage devices selectively capture power from the energy source and selectively provide power to the load. The energy flow controller includes a power monitor, a first energy level monitor, a second energy level monitor, an energy converter, and a controller. The power monitor monitors a difference between power provided by the energy source and an immediate energy requirement of the load and produces, for the controller, a power signal indicative of the monitored difference. The first energy level monitor monitors an energy level of the first energy storage device and provides, to the controller, a first energy level signal indicative of the energy level of the first energy storage device. The second energy level monitor monitors an energy level of the second energy storage device and provides, to the controller, a second energy level signal indicative of the energy level of the second energy storage device. The energy converter is responsive to a capture signal from the controller for selectively converting power from the energy source into power for at least one of the first and second energy storage devices and responsive to a switch signal from the controller for directing the converted power to at least one of the first energy storage device and the second energy storage device. The controller determines from the power signal that the energy provided by the energy source exceeds the immediate energy requirement of the load and provides the capture signal to the energy converter such that the energy provided by the energy source in excess of the immediate energy requirement of the load is captured in the first energy storage device unless the first energy level signal indicates that the energy level of the first energy storage device is at a first maximum threshold. If the first energy level signal indicates that the energy level of the first energy storage device is at the first maximum threshold, then the controller alters the switch signal such that the energy converter directs the energy in excess of the immediate energy requirement of the load to the second energy storage device unless the second energy level signal indicates that the energy level of the second energy storage device is at a second maximum threshold.

The disclosure is further directed to another method of stabilizing power provided by an energy source to a load. A first energy storage device captures energy produced by the energy source in excess of an immediate energy requirement of the load for a first predetermined amount of time unless an energy level of the first energy storage device exceeds a first maximum threshold. A second energy storage device captures energy produced by the energy source in excess of the immediate energy requirement of the load when the energy source continues to produce energy in excess of the immediate energy requirement of the load after expiration of the first predetermined amount of time or when the energy level of the first energy storage device is at the first maximum threshold, unless an energy level of the second energy storage device is at a second maximum threshold. In one embodiment, another aspect of stabilizing power provided by the energy source to the load includes providing energy from the first energy storage device to the load for a second predetermined amount of time upon the immediate energy requirement of the load exceeding the energy produced by the energy source unless the energy level of the first storage device is at a first minimum threshold. The second energy storage device provides energy to the load when the immediate energy requirement of the load continues to exceed the energy produced by the energy source following the second predetermined amount of time or when the energy level of the first energy storage device is at the first maximum threshold, unless the energy level of the second energy storage device is at a second minimum threshold.

The disclosure is further directed to another system for providing power to a load. The system includes an energy source, a first energy storage device, a second energy storage device, and an energy flow controller. The energy source provides power and the first and second energy storage devices selectively capture power from the energy source and selectively provide power to the load. The energy flow controller includes a power monitor, a first energy level monitor, a second energy level monitor, an energy converter, and a controller. The power monitor monitors a difference between power provided by the energy source and an immediate energy requirement of the load and produces, for the controller, a power signal indicative of the monitored difference. The first energy level monitor monitors an energy level of the first energy storage device and provides, to the controller, a first energy level signal indicative of the energy level of the first energy storage device. The second energy level monitor monitors an energy level of the second energy storage device and provides, to the controller, a second energy level signal indicative of the energy level of the second energy storage device. The energy converter is responsive to a capture signal from the controller for selectively converting power from the energy source into power for at least one of the first and second energy storage devices and responsive to a switch signal from the controller for directing the converted power to at least one of the first energy storage device and the second energy storage device. The controller determines from the power signal that the energy provided by the energy source exceeds the immediate energy requirement of the load and provides the capture signal to the energy converter such that the energy provided by the energy source in excess of the immediate energy requirement of the load is captured in the first energy storage device for a first predetermined amount of time unless the first energy level signal indicates that the energy level of the first energy storage device is at a first maximum threshold. If the first energy level signal indicates that the energy level of the first energy storage device is at the first maximum threshold or the energy source continues to produce power in excess of the immediate energy requirement of the load after expiration of the first predetermined period of time, then the controller alters the switch signal such that the energy converter directs the energy in excess of the immediate energy requirement of the load to the second energy storage device unless the second energy level signal indicates that the energy level of the second energy storage device is at a second maximum threshold.

The disclosure is also directed to another method of stabilizing power provided by an energy source to a load. A first energy storage device captures energy produced by the energy source in excess of an immediate energy requirement of the load up to an intake rate threshold of the first energy source. A second energy storage device captures energy produced by the energy source in excess of the sum of the immediate energy requirement of the load and the intake rate threshold of the first energy storage device. In one embodiment, the first energy storage device provides energy to the load when the immediate energy requirement of the load exceeds the energy produced by the energy source up to a discharge rate threshold of the first energy storage device. The second energy storage device provides energy to the load when the immediate energy requirement of the load exceeds the sum of the energy produced by the energy source and the discharge rate threshold of the first energy storage device up to a discharge rate threshold of the second energy storage device.

The disclosure is also directed to another method of stabilizing power provided by an energy source to a load. A first energy storage device captures energy produced by the energy source in excess of an immediate energy requirement of the load unless the energy produced in excess of the immediate energy requirement of the load exceeds an intake rate threshold of the first energy storage device. A second energy storage device captures energy produced by the energy source in excess of the immediate energy requirement of the load if the energy produced in excess of the immediate energy requirement of the load exceeds an energy intake rate threshold of the first energy storage device. In one embodiment, the first energy storage device provides energy to the load when the immediate energy requirement of the load exceeds the energy provided by the energy source and a difference between the immediate energy requirement of the load and the energy produced by the energy source is less than a discharge rate threshold of the first energy storage device. The second energy storage device provides energy to the load when the difference between the immediate energy requirement of the load and the energy provided by the energy source exceeds the discharge rate threshold of the first energy storage device.

One or more of the additional features detailed below may be incorporated into one or more of the above-noted embodiments, without departing from the scope of the present disclosure.

DETAILED DESCRIPTION

Figure 1:
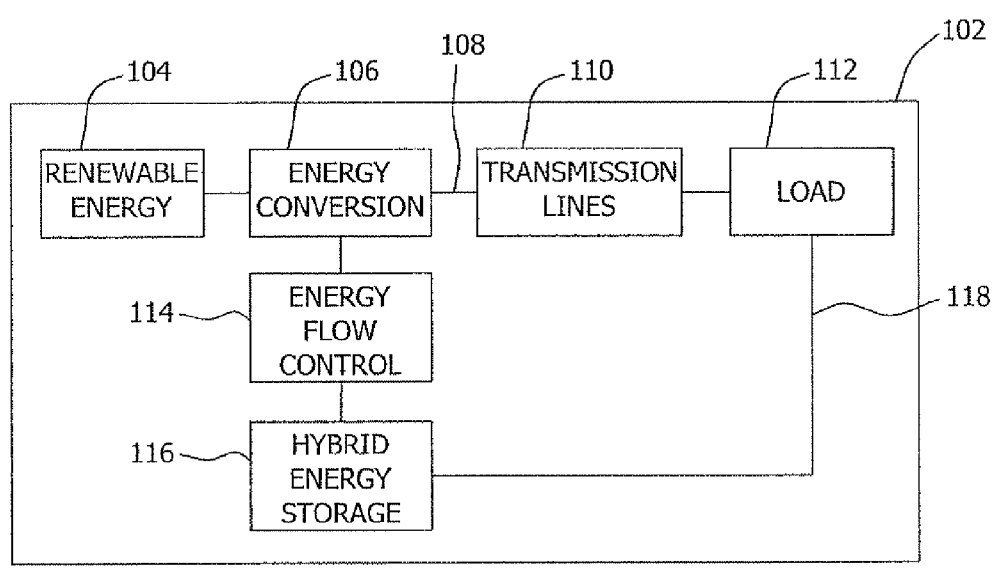
FIG. 1 is a block diagram of one embodiment of a system for stabilizing energy provided to a load that includes a renewable energy source, an energy converter, transmission lines, an energy flow controller, and a hybrid energy storage system.

The following description is not intended to limit the scope or applicability of the invention in any way. Rather, the following description is intended to provide convenient illustrations for implementing various embodiments of the invention. As will become apparent, various changes can be made to the methods, structures, devices, systems, components, and compositions described in these embodiments without departing from the spirit and scope of the invention.

The term "renewable energy" as used within this disclosure refers to energy that is obtained from natural resources that are not depleted when energy is obtained from them. Examples of renewable energy sources include wind, solar, hydroelectric, biomass, and geothermal natural resources. As set forth in more detail below, various embodiments of the present invention provide systems and methods for integrating renewable energy sources into existing electrical systems.

Various embodiments of the invention include devices for rapid and accurate sensing of the loss of a renewable energy source or the loss of a transmission line to prevent or mitigate any interruption of the supply of electrical energy to users. Sensing of physical parameters as well as stochastic and/or adaptive control techniques may provide for optimal control, selection, switching, synchronization and other functions necessary to select and utilize one of several different energy storage devices available to supply energy to the user. For example, a voltage of an energy storage device may be sensed in order to determine a state of charge or energy level of the energy storage device. Further, multiple physical parameters such as temperature, cycle life, and voltage may be used to determine the state of charge or energy level of the energy storage device.

The term "hybrid energy storage system" as used within this disclosure refers to a single energy storage device (ESD) or multiple connected energy storage devices (e.g., an array of energy storage devices connected in a series and/or parallel arrangement) that store energy in different forms and in different ways for release at a later time. Examples of energy storage devices suitable for use in hybrid energy storage devices include electrochemical cells, batteries, fuel cells, capacitors, compressed air tanks, flywheels, pumped hydro systems, flow batteries, thermal storage systems, and the like. One skilled in the art will recognize that different energy storage devices have different characteristics useful in designing hybrid energy storage systems comprised of a combination of energy storage devices. For example, lithium or lithium ion based batteries are relatively expensive for a given capacity, have a relatively high energy density, and have a relatively high cycle life. Similarly, flywheels generally have an even higher cycle life, but they have a relatively high self discharge rate. In contrast, lead acid batteries are relatively inexpensive for the given capacity, have a relatively low energy density, and have a relatively low cycle life. Sodium sulfur based batteries have a balance of price for a given capacity, energy density, and cycle life. When designing a hybrid energy storage system, the available energy storage devices and their relative attributes may be mixed in various proportions to achieve the goals of the hybrid energy storage system within the constraints set by the location of the system and its intended use.

Some hybrid energy storage devices may be limited by location of the system. For example, compressed air typically requires large underground caverns or the like for compressed air storage, while pumped hydro systems generally require mountains, hills, dams, or the like to utilize mass and gravity for energy storage. Other hybrid energy storage devices may be portable. For example, electrochemical cells, batteries, fly wheels, and fuel cells may be trailer or truck mounted for rapid deployment to essentially any location.

In accordance with various embodiments of the invention, hybrid energy storage systems have sections, portions or separate energy storage devices, having different energy densities. For some hybrid energy storage systems, energy density is the ratio of the storage capacity to unit weight of the storage system. Other hybrid energy storage systems are better described by the ratio of storage capacity to unit volume. Both methods may be effective ways to measure the energy storage density of a hybrid energy storage system.

Exemplary hybrid energy storage systems additionally or alternatively may include sections, portions or separate energy storage devices, having different energy storage capacities. "Storage capacity" refers to how much energy may be stored in a given energy storage device or system. Storage capacity and energy storage density may largely determine how much power is available from a given hybrid energy storage system over a given a period of time.

The amount of power required by a load at a given time depends on several factors. For example, a residential home may require variable amounts of electrical power during daylight hours, but may require reduced and steady amounts of electrical power during nighttime hours. Likewise, a factory may require considerably more electrical power than a residential home and the required power may be relatively constant regardless of the time of day. Furthermore, by way of example, use of a computer or using a cell phone may require smaller amounts of electrical power for shorter periods of time. A plot of the amount of power or electrical energy required by a load versus time is herein referred to as the expected energy requirement profile of the load.

As used herein, "energy" refers to the product of power and time. Optimization of a hybrid energy storage system for use with an energy source may be dependent on the physical characteristics and application of the load including (but not limited to) an expected energy requirement profile of the load, the energy density of the hybrid energy storage system, the location of the energy source, the type of energy source, the location of the hybrid energy storage system, and the portability of the hybrid energy storage system.

Referring to FIG. 1, a renewable energy system 102 includes a renewable energy source 104, an energy converter 106, AC electrical energy 108, transmission lines 110, a load 112, an energy flow controller 114, and a hybrid energy storage system 116.

The renewable energy system 102 is configured to provide alternating current (AC) electrical energy 108 to the load 112 from the renewable energy source 104. Energy from the renewable energy source 104 is converted to AC electrical energy 108 and its phase and frequency are corrected by the energy converter 106. The AC electrical energy 108 is transmitted to the load 112 through the transmission lines 110. The load 112 may be a single user, consumer, factory, community, or an electrical grid used to distribute AC electrical energy to any number of consumers, users, factories, or communities. Similarly, the load 112 may be a portion of a dwelling such as a home or factory (e.g., a single circuit within the dwelling) or multiple dwellings such as multiple homes or factories.

When the renewable energy source 104 is not providing energy because of weather or other disturbances, the load 112 receives the AC electrical energy 118 from the hybrid energy storage system 116. Similarly, when the transmission line 110 becomes inoperable because of weather or other disturbances, the load 112 receives AC electrical energy 118 from the hybrid energy storage system 116. The hybrid energy storage system 116 may be located either close to the load 112 or some distance from the load 112. If the hybrid energy storage system 116 is located some distance from the load 112, either the transmission lines 110 may be configured and connected to the hybrid energy system 116 to provide the AC electrical energy 118 to the load 112 or another suitable transmission device may be used. When the hybrid energy storage system 116 is depleted, the load 112 may not receive AC electrical energy 118 from the hybrid energy storage system 116 unless or until the hybrid energy storage system 116 has been replenished. The hybrid energy storage system 116 may be replenished by energy flow controller 114 via the renewable energy source 104 or some other energy source (not shown) managed by the energy flow controller 114.

Figure 2:
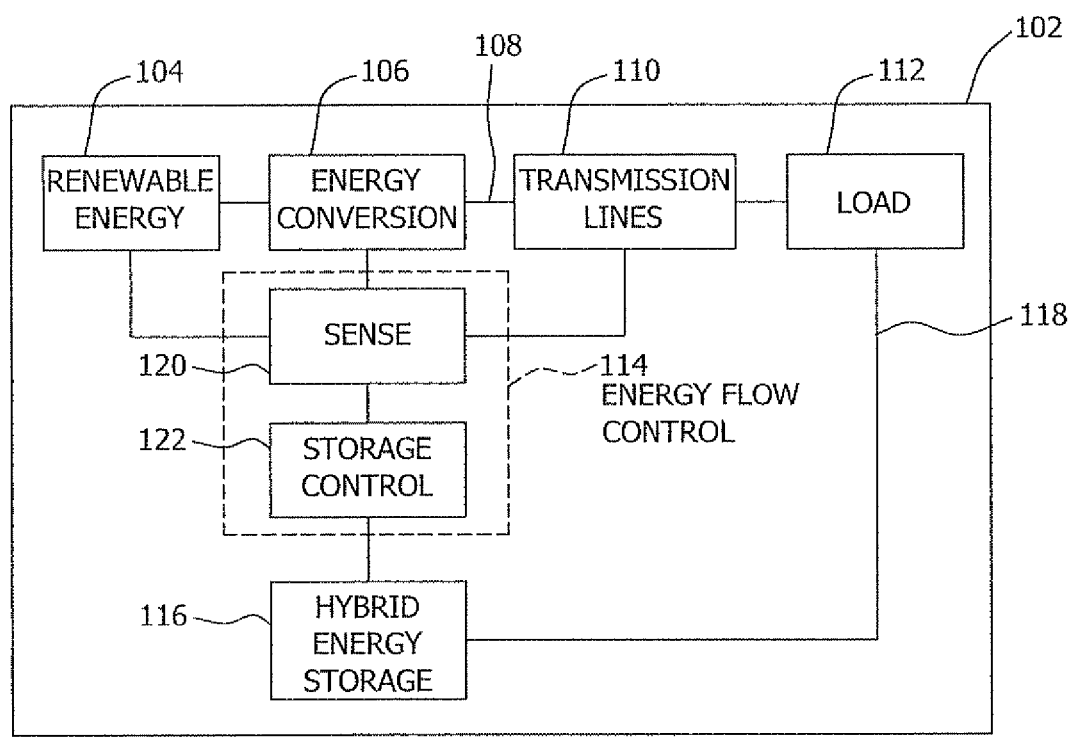
FIG. 2 is a block diagram of one configuration of the system of FIG. 1, wherein the energy flow controller utilizes sense and storage control functions.

Referring to FIG. 2, a more detailed block diagram of the renewable energy system 102 illustrates a sense component 120 and storage control 122 of the energy flow controller 114. In the illustrated example, the energy flow controller 114 includes a sense component 120 and a storage control 122 configured to sense, determine, react to, and control the loss of the renewable energy source 104 and/or loss of the transmission lines 110 function.

The sense component 120 may be configured to facilitate determining an energy output provided by the renewable energy source 104 and/or loss of the transmission lines 110 by sensing one or more physical parameters of the renewable energy source 104 and/or the transmission lines 110. These physical parameters may include (but are not limited to) voltage, current, time, temperature, and strain.

Direct physical contact between the sense component 120 and/or the renewable energy source 104 and/or the transmission lines 110 may be utilized to facilitate accurate measurement of the physical parameters. For example, measuring voltage may utilize a direct connection of voltmeter probe(s) to the renewable energy source 104 and/or the transmission lines 110, and temperature measurement may utilize direct physical contact of a thermistor or thermometer to the renewable energy source 104 and/or the transmission lines 110. Direct physical contact methods of measurement include (but are not limited to) analog, digital and/or other comparison techniques.

Indirect methods may also be utilized to measure the physical parameters associated with the renewable energy source 104 and/or the transmission lines 110. For example, measuring the physical parameters may not be possible using direct measurement techniques because the renewable energy source 104 and/or the transmission lines 110 may be isolated or in a remote (or inaccessible) location. Indirect measurement techniques may include (but are not limited to) inductive coupling, capacitive coupling, and optical coupling.

The storage control 122 may be implemented as hardware, software or a combination of both. The storage control 122 may be programmable, and may receive input from the sense component 120. The storage control 122 may apply application logic to input signal(s), for example, signals received from the sense component 120, and may provide output signal(s) for further system use, including supplying energy to the hybrid energy storage 116. The storage control 122 may use stochastic and/or adaptive control techniques (i.e., learning algorithms) to provide for optimal control, selection, switching, synchronization and any other functions necessary to select and use one of several different energy storage devices available to capture (i.e., store) energy and supply the AC electrical energy to the load 112.

Figure 3:
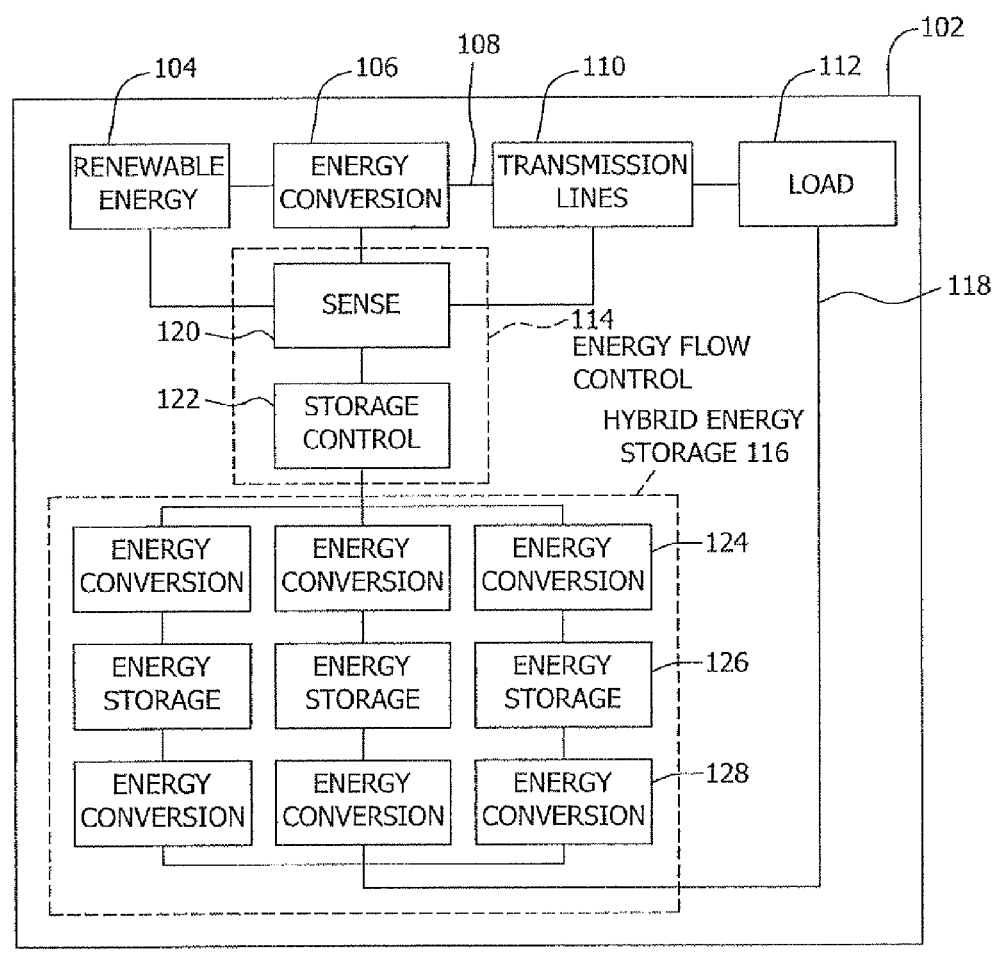
FIG. 3 is a block diagram of one configuration of the system of FIG. 1 having energy conversion components associated with each energy storage device.

Referring to FIG. 3, a more detailed block diagram of the renewable energy system 102, illustrates one embodiment of the hybrid energy storage system 116 in detail. In the exemplary embodiment of FIG. 3, the hybrid energy storage system 116 comprises the energy conversion 124, the energy storage devices 126, and the energy conversion 128.

The energy conversion 124 provides for conversion of AC electrical energy into a compatible form of energy for storage or capture in a particular energy storage medium or device. The energy conversion 124 may facilitate replenishing the energy in energy storage 126 after depletion, or at any charge level of energy storage 126. Various components may provide systems and methods for converting energy for storage in the energy storage devices 126. For example, AC electrical energy may be used to power an air compressor to produce compressed air for storage in a cavern or tank. Furthermore, by way of example, electrical energy may be used to power a battery charger, alternator, or other electrical machine for charging an electrochemical cell or battery.

The energy storage devices 126 store or capture energy provided by the energy conversion 124 for later providing the stored energy to the energy conversion 128 such that the stored energy may be supplied by the energy conversion 128 to the load 112 as AC electrical energy (i.e., power). For example, a first energy storage device might be an electrochemical cell, battery, or array thereof; a second energy storage device might be a group of fuel cells; and a third energy storage device of the energy storage devices 126 might be a pumped hydro storage medium. The quantity (number) and types of energy storage mediums used in the energy storage devices 126 is dependent upon the configuration and location of the renewable energy system, a desired energy density of the renewable energy system 102, and a desired capacity of the renewable energy system 102. One skilled in art will appreciate that these design considerations will vary from system to system. For example, one renewable energy system 102 may utilize two different energy storage mediums in energy storage devices 126, while a different renewable energy system 102 may utilize four different energy storage mediums in energy storage devices 126. Energy storage devices are generally selected to minimize the overall operating expense of the hybrid energy storage system. The overall operating expense includes initial purchase of materials, installation, and maintenance over the useful life of the hybrid energy storage system. In one embodiment of a hybrid energy storage system scalable to most installations, the 10% of the energy storage capacity is achieved via lithium ion battery, 30% of the energy storage capacity is achieved via sodium sulfur battery, and 60% of the energy storage capacity is achieved via lead acid battery. The lithium ion battery is used for the majority of cycles (i.e., storage or discharge to stabilize the power provided from the energy source 104 to the load 112) due to its high cycle life and high price for a given capacity. The sodium sulfur battery is used for longer or deeper cycles due to its balance of cycle life and price for a given capacity. The lead acid battery is used for very long cycles because of its low price for a given capacity and low cycle life. By combining the strengths of these various energy storage device types in various proportions, initial purchase and installation costs can be reduced along with maintenance costs, and overall service life can be maximized for the constraints presented by the given installation.

The energy conversion 124 converts the stored energy in the energy storage devices 126 into AC electrical energy 118 for transmission to the load 112. Generally, the energy stored in the hybrid energy storage system 116 is not in a form compatible with an electric grid (e.g., transmission lines 110) or in phase with and of the same frequency as energy being supplied to a user. Various systems and methods are utilized to convert energy from a particular energy storage medium into AC electrical energy 118 for transmission to the load 112. For example, releasing energy from a pumped hydro reservoir involves releasing water from the reservoir and allowing gravity to draw the released water through a turbine that turns an electrical generator that produces AC electrical energy 118. In one embodiment, this system would also include a device for matching the phase and frequency of the AC electrical energy 118 to energy already being supplied to the load 112. As another example, a fuel cell may be the energy input to an inverter that produces AC electrical energy 118 as an output. As another example, an inverter is used to convert energy from an electrochemical cell into AC electrical energy 118.

Figure 4:
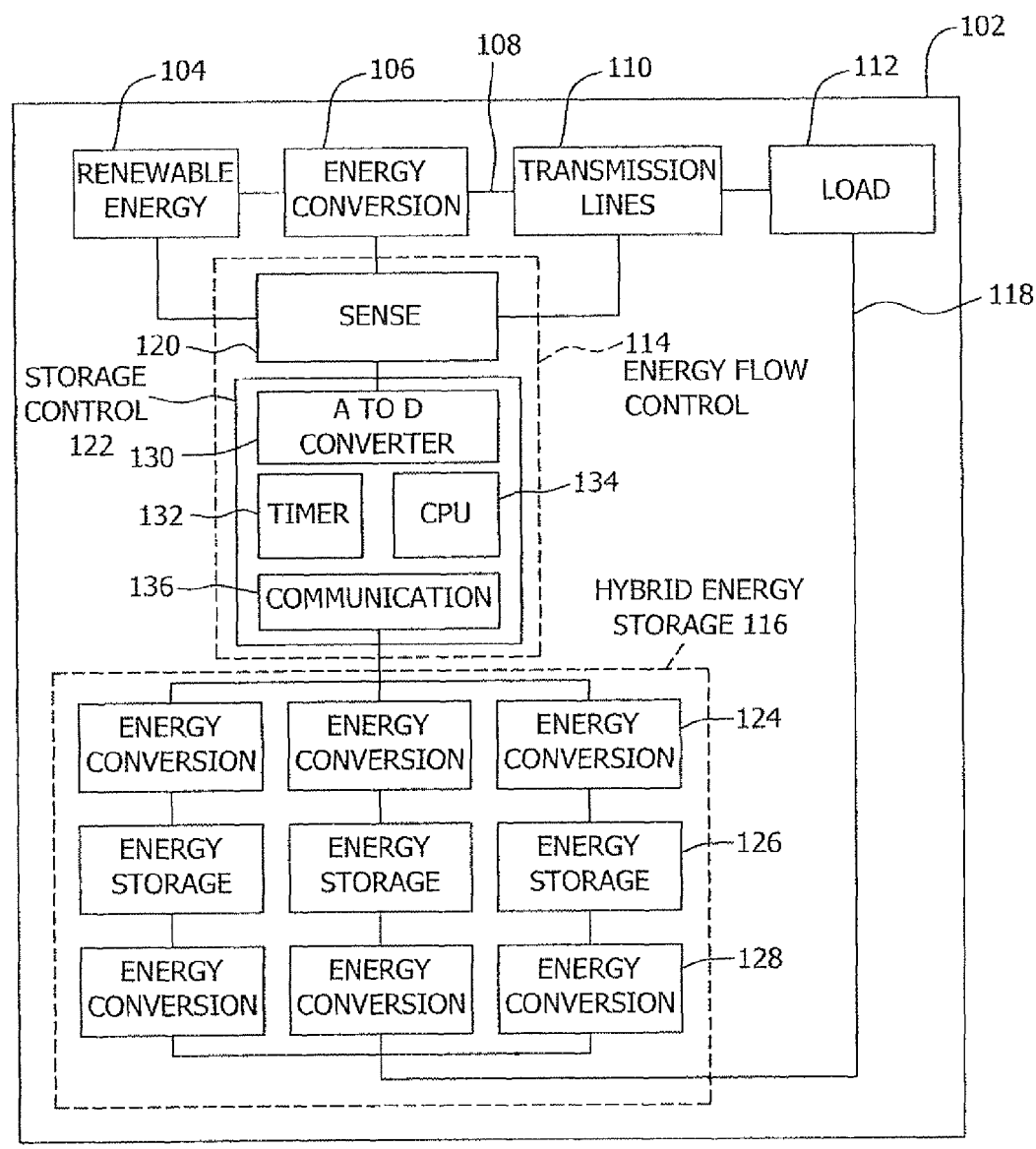
FIG. 4 is a block diagram of one configuration of the system of FIG. 2, wherein the storage control includes an analog to digital converter, a timer, a central processing unit, and a communication component.

Referring to FIG. 4, one embodiment of the storage control 122 comprises various functional elements, such as an analog to digital converter 130, a timer function 132, a central processing unit (CPU) function 134 and a communication function 136.

Elements of the storage control 122 may be implemented as hardware, software or a combination of both. Stochastic and/or adaptive control techniques may provide for optimal control, selection, switching, synchronization and other functions to select and utilize one of several different energy storage devices 126 available to supply energy for conversion to AC electrical energy 118 to load 112. In addition, AC electrical energy is supplied as available to hybrid energy storage system 116 to replenish and maintain desired or optimum energy levels in the energy storage devices 126. Other functions may be present in storage control 122 without departing from the scope of this disclosure such as energy balancing between the energy storage devices 126.

Communication and control among the components of the system 102 may be accomplished through any suitable communication channels, such as, for example, a telephone network, an extranet, an Intranet, Internet, point of interaction device (point of sale device, personal digital assistant (e.g., Palm Pilot®, Blackberry®, cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Further, the communications protocol between the components may include both serial and parallel data transmission.

Figure 5:
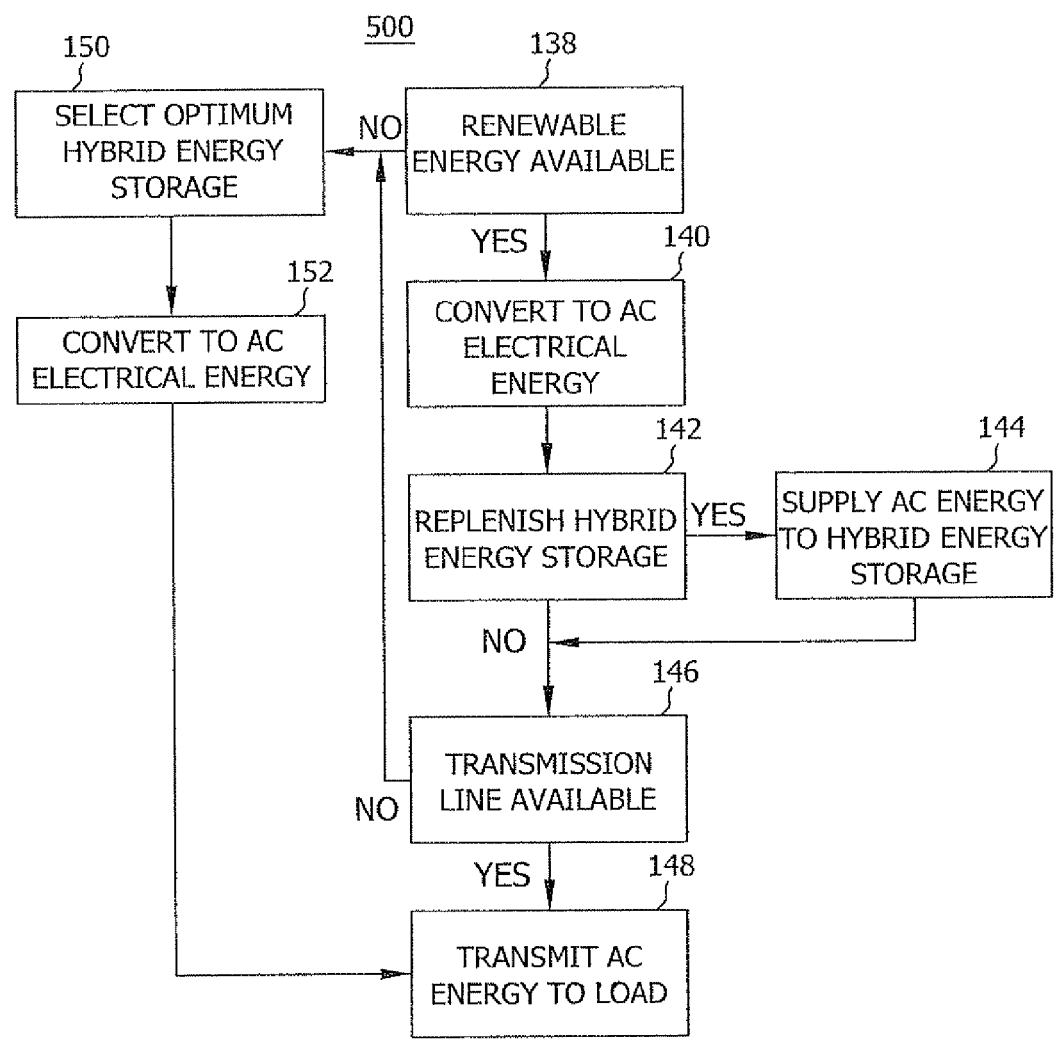
FIG. 5 is a flow diagram of a method for using and controlling a hybrid energy storage system, in accordance with various embodiments and configurations.

Referring to FIG. 5, a method 500 for using a plurality of hybrid energy source storage mediums and devices of varying capacities for stabilizing power provided by a renewable energy source is shown. At 138, the CPU function 134 determines if renewable energy source 104 is available. If the renewable energy source is not available, the CPU function 134, at step 150, selects a hybrid energy storage device or system for supplying energy for conversion into AC electrical energy at step 152. The AC electrical energy from step 152 is transmitted to load 112 at step 148. If the renewable energy source is available at step 138, then the renewable energy is converted into AC electrical energy at step 140. At step 142, the CPU 134 determines if the hybrid energy storage system 116 should be replenished. If the hybrid energy storage system 116 is to be replenished, AC electrical energy is supplied at step 144 to the hybrid energy storage system 116 and the CPU function 134 proceeds to step 146. If the hybrid energy storage 116 is not to be replenished, then the process moves to step 146 from step 142. At step 146, the availability of the transmission line 110 is determined by CPU function 134. If the transmission line 110 is not available, the CPU function 134 moves to step 150 where the optimum energy storage device is selected. If the transmission line 110 is available at step 146, AC electrical energy is transmitted to the load 122 at step 148 from the optimum energy storage device via an appropriate energy conversion.

It should be understood that the process illustrated above may be closed loop and iterative, and that the processes or method may include other optional steps without departing from the scope of the invention. Various functional elements in the energy flow control 114, such as the analog to digital converter 130, the timer function 132, the CPU function 134, and the communication function 136 are used to facilitate sensing, control and communications within the renewable energy system 102.

Figure 6:
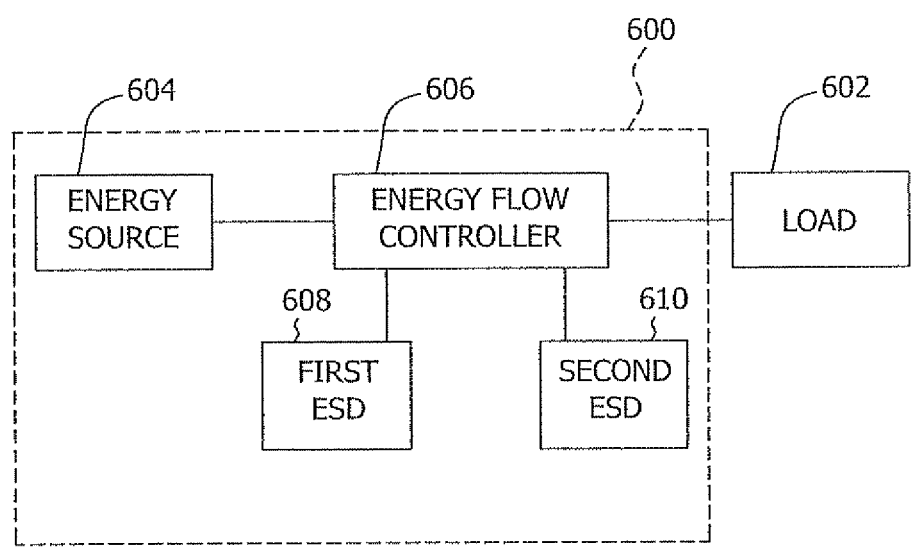
FIG. 6 is a block diagram of another embodiment of a system for stabilizing power provided by an energy source to a load.

Referring to FIG. 6, a system 600 provides energy to a load 602. The system 600 includes an energy source 604, an energy flow controller 606, a first energy storage device 608, and a second energy storage device 610. The first energy storage device 608 and second energy storage device 610 make up a hybrid energy storage system 612. The energy source 604 may be a renewable energy source such as a wind turbine or a solar panel providing a relatively variable power supply, or a nonrenewable energy source such as a gas turbine providing a relatively constant power supply. In either case, an immediate energy requirement of the load 602 varies, and the energy flow controller 606 selectively stores energy in the energy storage devices and provides power from the energy storage devices such that the immediate energy requirement of the load 602 is met.

One skilled in the art will recognize that the energy flow controller 606 may directly connect the energy source 604 to the load 602 and selectively capture and provide energy to this connection, or the energy flow controller 606 may contain phase, frequency, and amplitude matching devices necessary for connecting the energy source 604 to the load. Further, in one embodiment, the energy flow controller 606 manages multiple energy sources to meet the immediate energy requirement of the load 602. For example, in one embodiment, a gas turbine is directly connected to the load 602, a wind turbine is connected to the load 602 via the energy flow controller 606, and the energy flow controller selectively stores energy from the wind turbine and gas turbine as a function of the power being provided by each energy source and the immediate energy requirement of the load 602. One skilled in the art will also recognize that the system 600 may include any number and type of energy sources and energy storage devices as described above. In one embodiment, a first energy storage device is a lithium based electrochemical cell accounting for 10% of the total storage capacity of the energy storage devices, a second energy storage device is a sodium sulfur or NiCad electrochemical cell accounting for 30% of the total storage capacity of the energy storage devices, and a third energy storage device is a lead acid electrochemical cell accounting for 60% of the total storage capacity of the energy storage devices.

Figure 7:
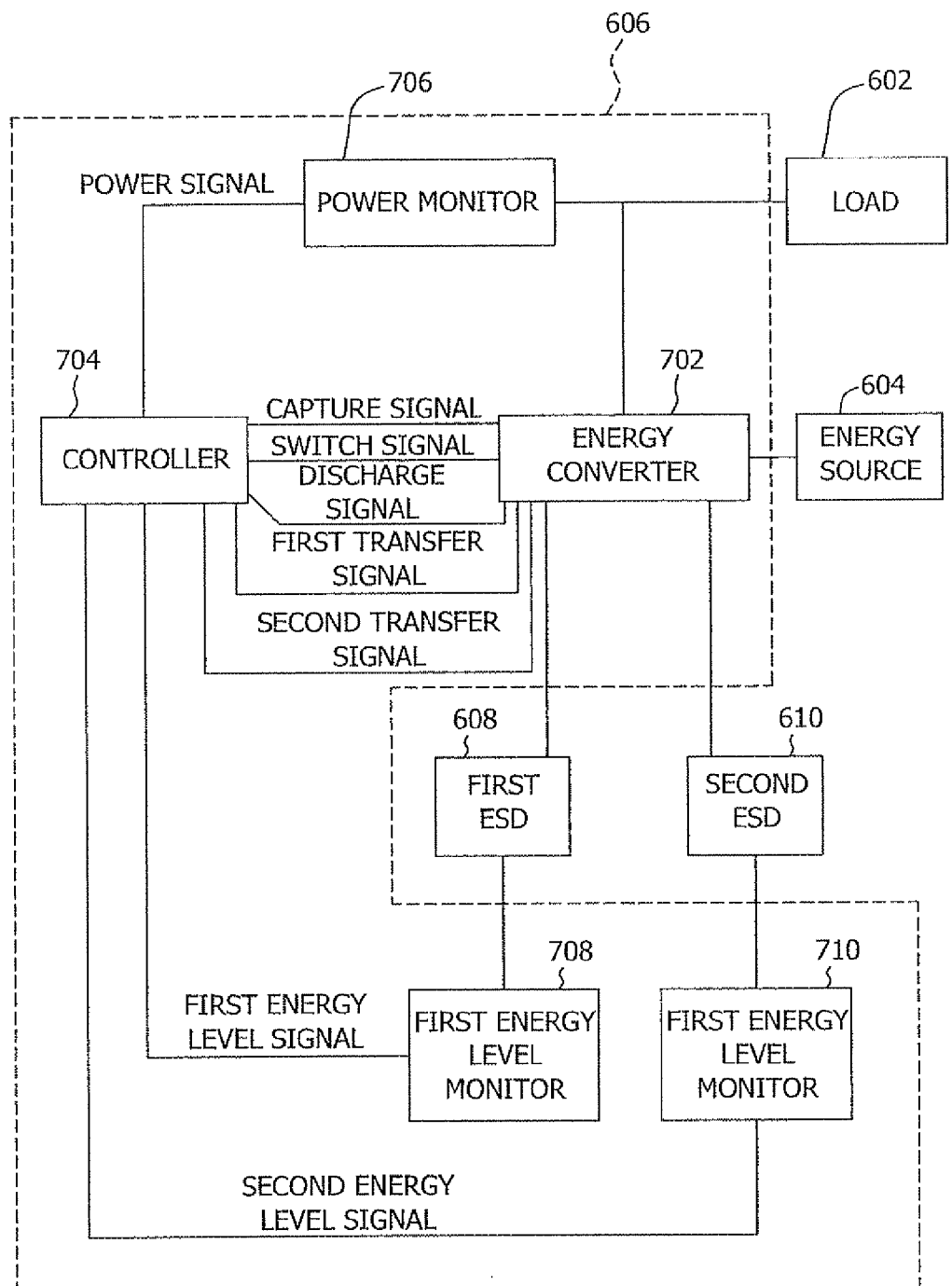
FIG. 7 is a block diagram of the system of FIG. 6 detailing one configuration of the energy flow controller.

Referring to FIG. 7, the energy flow controller 606 comprises an energy converter 702, a controller 704, a power monitor 706, a first energy level monitor 708, and a second energy level monitor 710. The energy converter 702 receives power from the energy source 604 and converters the power for storage in either of the first energy storage device 608 and second energy storage device 610, or provides the power to the load 602. In one embodiment, at least one of the energy storage device 608, 610 is an electrochemical cell, and the energy converter 702 comprises a rectifier for converting power from the energy source 604 into energy for storage in at least one of energy storage devices 608, 610, and an inverter for converting energy from at least one of the energy storage devices 608, 610 into power for the load 602. Optionally, the energy converter matches the amplitude, frequency, and phase of the power to the load 602. The energy converter also converts energy stored in the first energy storage device 608 and second energy storage device 610 into power for use by the load 602. Additionally, the energy converter contains a switch matrix or array of energy conversion devices for transferring energy between the energy storage devices (e.g., first and second energy storage devices 608 and 610). In one embodiment, the energy storage devices, 608, 610 include energy conversion components for converting energy stored in the energy storage device into a form useful to the energy converter 702.

The monitors 706, 708, 710 or sensors provide signals indicative of certain conditions to the controller 704. The power monitor 706 (i.e., power sensor) provides a power signal indicative of an immediate energy requirement of the load 602 to the controller 704. In one embodiment, the power signal is indicative of a difference between the power provided by the energy source 604 and the immediate energy requirement of the load 604. In another embodiment, the power signal is indicative of a voltage at the load 602. The first energy level monitor 708 provides a first energy level signal to the controller 704 indicative of an energy level of the first energy storage device 608. The second energy level monitor 710 provides a second energy level signal to the controller 704 indicative of an energy level of the second energy storage device 610. In one embodiment, the first and second energy level signals are indicative of a voltage of the respective energy storage devices. In another embodiment, the first and second energy level signals are indicative of a state of charge of the respective energy storage devices determined as a function of at least one of: a voltage of the respective energy storage devices, a capacity of the respective energy storage devices, a temperature of the respective energy storage devices, a strain of the respective energy storage devices, and a current of the respective energy storage devices.

The controller 704 is responsive to the power signal, first energy level signal, and the second energy level signal for instructing the energy converter 702 to selectively capture and/or store energy in each of the energy storage devices (e.g., first and second energy storage devices 608 and 610). In one embodiment, the controller 704 instructs the energy converter 702 by selectively providing a capture signal, a switch signal, a discharge signal, a first transfer signal, and a second transfer signal to the energy converter 702. One skilled in the art will recognize that these signals may be provided by way of a parallel or serial communication system. That is, each signal may be provided on a dedicated line to the energy converter 702, or the signals may be transmitted to the energy converter 702 as a set of states of the signals via a packet of information in a serial transmission format. The energy converter 702 is responsive to the capture signal for storing energy provided by the energy source 604 in at least one of the energy storage devices 608, 610. The energy converter 702 is responsive to the switch signal for operating a switch matrix or array of energy conversion devices within the energy converter 702 to direct energy being stored to at least one energy storage device selected by the controller 704 or for determining which of the energy storage devices to extract energy from for conversion and supply to the load 602. The energy converter 702 is responsive to the discharge signal for extracting energy from at least one of the energy storage devices 608, 610, converting the extracted energy to power for the load 602, and providing the power to the load. The energy converter 702 is responsive to the first transfer signal for transferring energy from the first energy storage device 608 to the second energy storage device 610. The energy converter 702 is responsive to the second transfer signal for transferring energy from the second energy storage device 610 to the first energy storage device 608.

Figure 8:
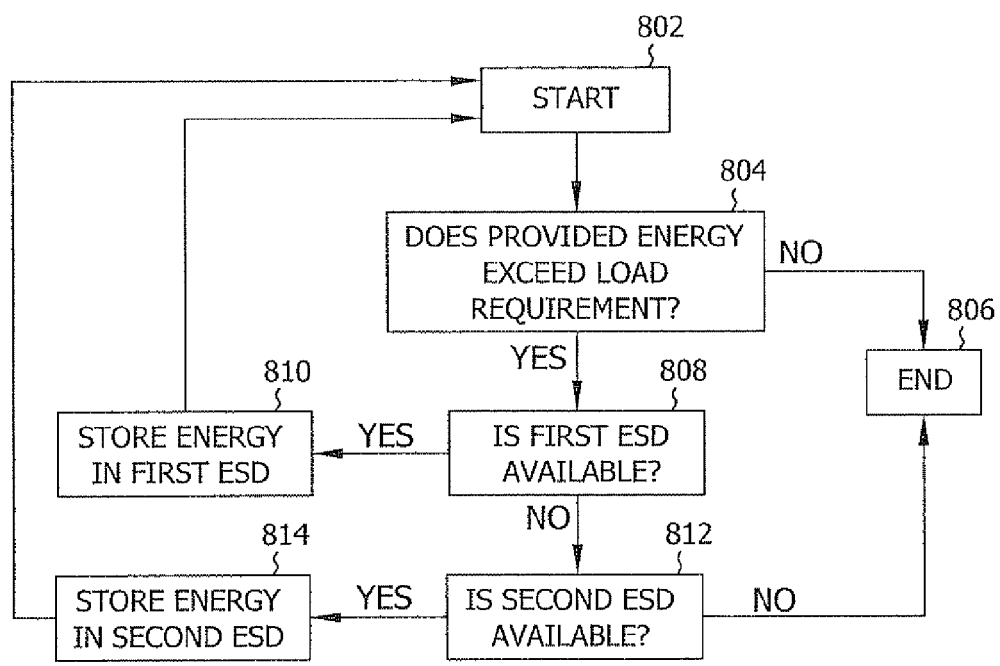
FIG. 8 is a flow diagram of one embodiment of a method of selecting an energy storage device for capturing power provided by an energy source in excess of an immediate energy requirement as a function of an energy level and capacity of the energy storage devices.

Referring to FIG. 8, a method of selecting an energy storage device for capturing energy provided by the energy source 604 in excess of the immediate energy requirement of the load 602 begins at 802. At 804, the controller 704 determines whether energy provided by the energy source 604 exceeds the immediate energy requirement of the load 602. If the energy provided by the energy source 604 does not exceed the immediate energy requirement of the load 602, then the method ends at 806. If the energy provided by the energy source 604 exceeds the immediate energy requirement of the load 602, then the controller 704 determines whether the first energy storage device 608 is available at 808. In one embodiment, determining whether the first energy storage device 608 is available comprises at least one of: determining whether the energy level of the first energy storage device 608 is at a maximum threshold of the first energy storage device 608, determining whether a temperature of the first energy storage device 608 exceeds a predetermined temperature limit, determining whether a number of cycles of the first energy storage device 608 exceeds a predetermine cycle limit, determining whether a storage discharge efficiency of the first energy storage device 608 has decreased below a predetermined minimum, and determining whether a strain of the first energy storage device 608 exceeds a predetermined strain. If none of these adverse conditions is present (or a condition is not tested for) in the first energy storage device 608, the controller determines that the first energy storage device 608 is available and proceeds to store energy in the first energy storage device at 810 and continues back to 804. If the first energy storage device 608 is not available, then the controller 704 proceeds to determine whether the second energy storage device 610 is available at 812. In one embodiment, the second energy storage device 610 is a sodium sulfur electrochemical cell and availability is determined based on conditions similar to those of the first energy storage device 608. If the second energy storage device 610 is available at 812, then the controller instructs the energy converter 702 to capture (i.e., store) energy in the second energy storage device 610 at 814 and proceeds back to 804. If the second energy storage device 610 is not available at 812, then the controller 704 ends at 806. Optionally, the controller 704 may instruct the energy converter 704 to reduce the flow of power form the energy source 604 to the load 602 to protect the load 602 from excessive power. One skilled in the art will recognize that the controller 704 can be configured to instantly interrupt the method of FIG. 8 in response to the immediate energy requirement of the load 602 exceeding the power provided by the energy source 604.

Figure 9:
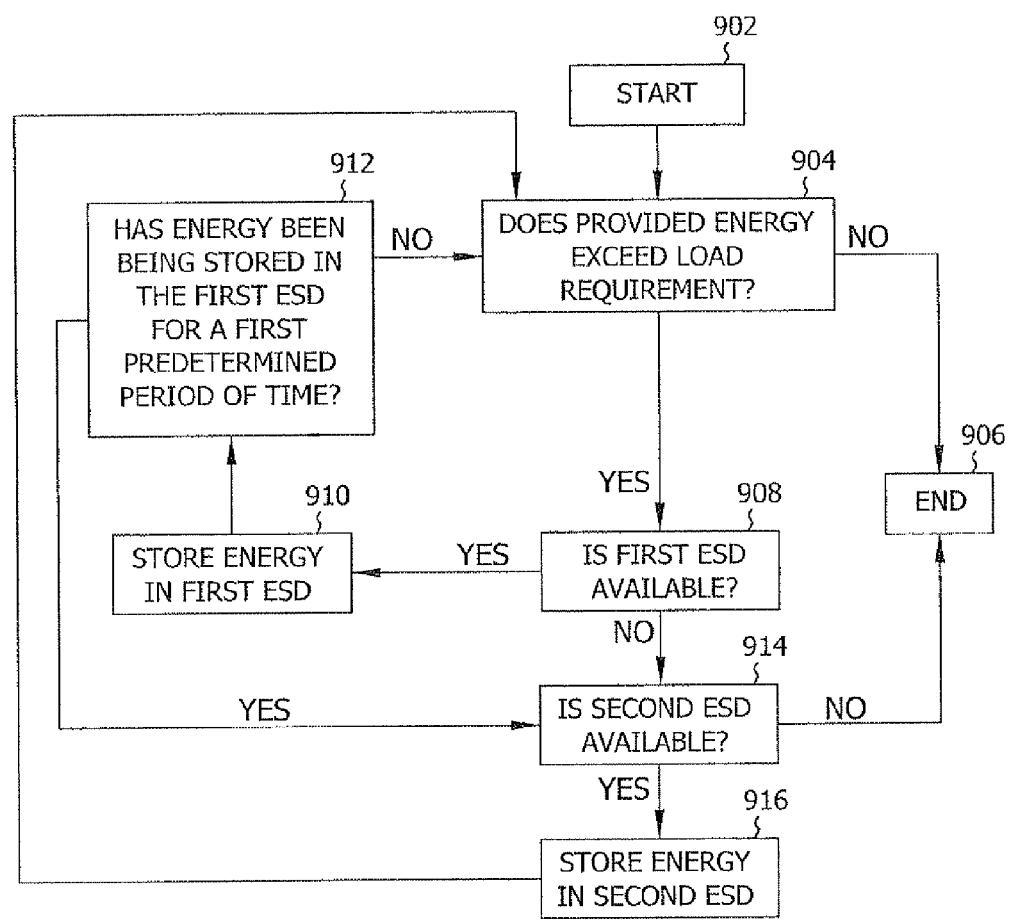
FIG. 9 is a flow diagram of another embodiment of a method of selecting an energy storage device for capturing power provided by an energy source in excess of an immediate energy requirement as a function of a duration of the energy source producing power in excess of the immediate energy requirement of the load.

Referring to FIG. 9, a method of selecting an energy storage device for capturing energy provided by the energy source 604 in excess of the immediate energy requirement of the load 602 begins at 902. At 904, the controller 704 determines whether energy provided by the energy source 604 exceeds the immediate energy requirement of the load 602. If the energy provided by the energy source 604 does not exceed the immediate energy requirement of the load 602, then the method ends at 906. If the energy provided by the energy source 604 exceeds the immediate energy requirement of the load 602, then the controller 704 determines whether the first energy storage device 608 is available at 908. If the controller determines that the first storage device 608 is available at 908, the controller 704 proceeds to capture energy in the first energy storage device at 910 and continues to 912. At 912, the controller 704 determines whether energy has been being captured in the first energy storage device for a first predetermined amount of time. If energy has not yet been being captured in the first energy storage device 608 for the first predetermined amount of time, then the controller 704 proceeds back to 912. Alternatively, if energy has been being captured in the first energy storage device 608 for the first predetermined amount of time, then the controller 704 proceeds to determine whether the second energy storage device is available at 914. Similarly, if the controller 704 determines that the first energy storage device 608 is not available at 908, then the controller proceeds to 914. At 914, the controller 704 determines whether the second energy storage device 610 is available. If the second energy storage device 610 is available at 914, then the controller 704 instructs the energy converter 702 to capture (i.e., store) energy in the second energy storage device 610 at 916 and proceeds back to 904. If the second energy storage device 610 is not available at 914, then the controller 704 ends the process at 906. Optionally, the controller 704 may instruct the energy converter 704 to reduce the flow of power form the energy source 604 to the load 602 to protect the load 602 from excessive power. One skilled in the art will recognize that the controller 704 can be configured to instantly interrupt the method of FIG. 9 in response to the immediate energy requirement of the load 602 exceeding the power provided by the energy source 604.

Figure 10:
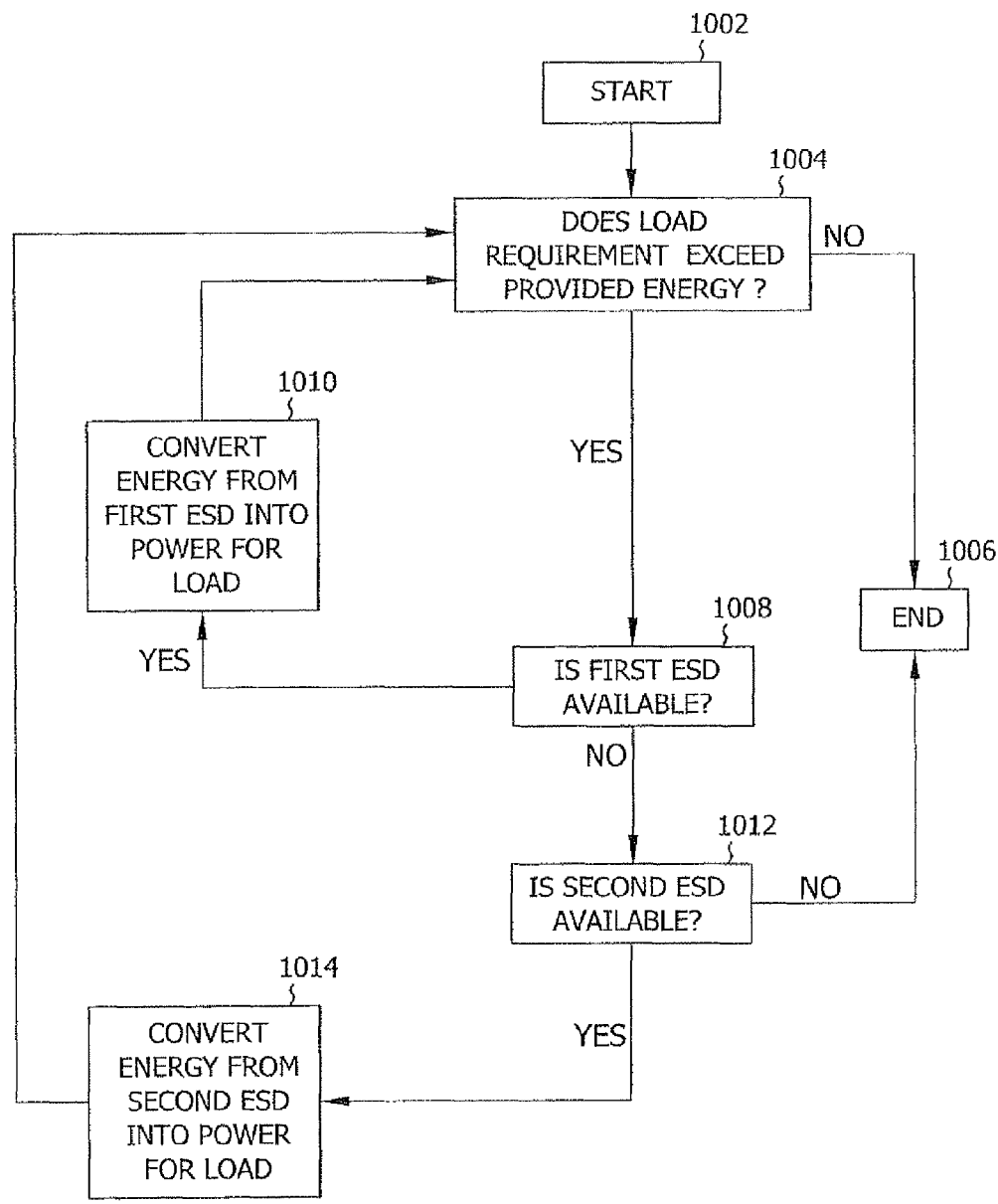
FIG. 10 is a flow diagram of one embodiment of a method of selecting an energy storage device for providing power to a load as a function of an energy level and capacity of the energy storage devices.

Referring to FIG. 10, a method of selecting an energy storage device to extract energy from to subsequently convert and provide to the load 602 begins at 1002. At 1004, the controller 704 determines whether the immediate energy requirement of the load 602 exceeds the energy provided by the energy source 604. If the immediate energy requirement of the load 602 does not exceed the energy being provided by the energy source 604, then the process ends at 1006. If the immediate energy requirement of the load 602 exceeds the energy being provided by the energy source 604, then the controller 704 continues to 1008 and determines whether the first energy storage device 608 is available. Availability of the first energy storage device 608 for discharge is determined based on the same conditions as for capturing energy in the first energy storage device 608 except that the controller 704 determines whether the energy level of the first energy storage device 608 is at a first minimum threshold instead of a first maximum threshold. If the first energy storage device 608 is available at 1008, then the controller 704 provides the appropriate signals to the energy converter 702 such that the energy converter extracts energy from the first energy storage device 608, converts the energy to power for the load 602 and provides the converted power to the load 602 at 1010. If the first energy storage device 608 is not available at 1008, then the controller proceeds to 1012 and determines whether the second energy storage device is available. If the second energy storage device 610 is not available, then the process ends at 1006. If the second energy storage device 610 is available, then the controller 704 provides the appropriate signals to the energy converter 702 such that the energy converter 702 extracts energy from the second energy storage device 610, converts the energy to power for the load 602 and provides the converted power to the load 602 at 1014. The controller 704 then proceeds back to 1004. One skilled in the art will recognize that the controller 704 can be configured to instantly interrupt the method of FIG. 10 in response to the power provided by the energy source 604 meeting and/or exceeding the immediate energy requirement of the load 602.

Figure 11:
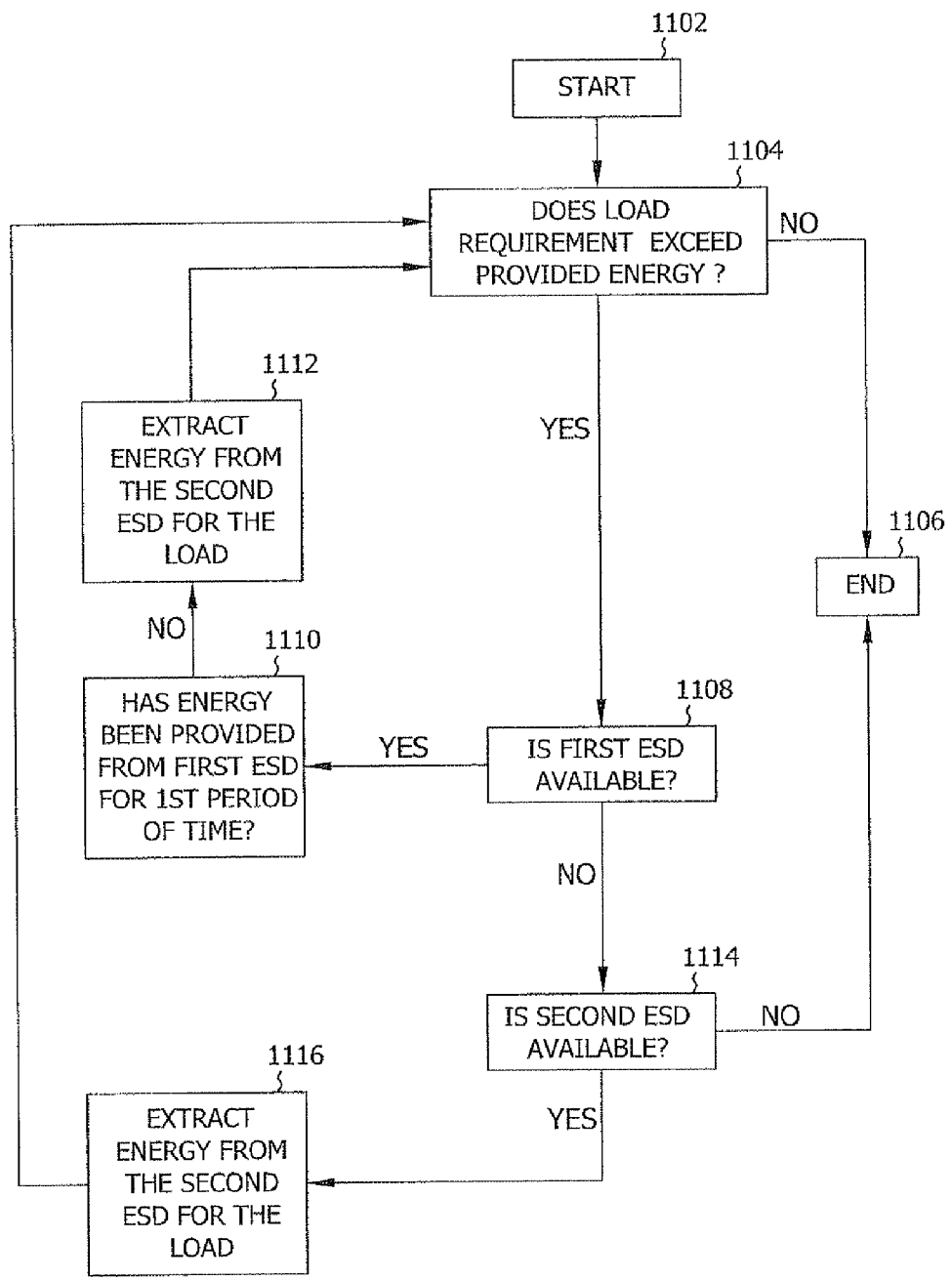
FIG. 11 is a flow diagram of one embodiment of a method of selecting an energy storage device for providing power to a load as a function of a duration of an immediate energy requirement of a load exceeding energy provided by an energy source.

Referring to FIG. 11, a method of selecting an energy storage device to extract energy from to subsequently convert and provide to the load 602 begins at 1102. At 1104, the controller 704 determines whether the immediate energy requirement of the load 602 exceeds the energy provided by the energy source 604. If the immediate energy requirement of the load 602 does not exceed the energy being provided by the energy source 604, then the process ends at 1106. If the immediate energy requirement of the load 602 exceeds the energy being provided by the energy source 604, then the controller 704 continues to 1108 and determines whether the first energy storage device 608 is available. Availability of the first energy storage device 608 for discharge is determined based on the same conditions as for capturing energy in the first energy storage device 608 except that the controller 704 determines whether the energy level of the first energy storage device 608 is at a first minimum threshold instead of a first maximum threshold. If the first energy storage device is available at 1108, then at 1110, the controller 704 then determines whether energy has been being provided from the first energy storage device for a second predetermined amount of time. If the controller 704 determines that the first energy storage device 608 is available at 1108 and that energy has not been being provided from the first energy storage device 608 to the load 602 for the second predetermined amount of time, then the controller 704 provides the appropriate signals to the energy converter 702 such that the energy converter 702 extracts energy from the first energy storage device 608, converts the energy to power for load 602 and provides the converted power to the load 602 at 1010. If the controller 704 determines that the first energy storage device 608 is not available at 1108 or that energy has been being provided from the first energy storage device 608 to the load 602 for the second predetermined amount of time at 1110, then the processor 704 proceeds to determine whether the second energy storage device 610 is available at 1114. If the second energy storage device 610 is not available, then the process ends at 1106. If the second energy storage device 610 is available, then the controller 704 provides the appropriate signals to the energy converter 702 such that the energy converter 702 extracts energy from the second energy storage device 610, converts the energy to power for load 602 and provides the converted power to the load 602 at 1116. The controller 704 then proceeds back to 1104. One skilled in the art will recognize that the controller 704 can be configured to instantly interrupt the method of FIG. 11 in response to the power provided by the energy source 604 meeting and/or exceeding the immediate energy requirement of the load 602.

Figure 12:
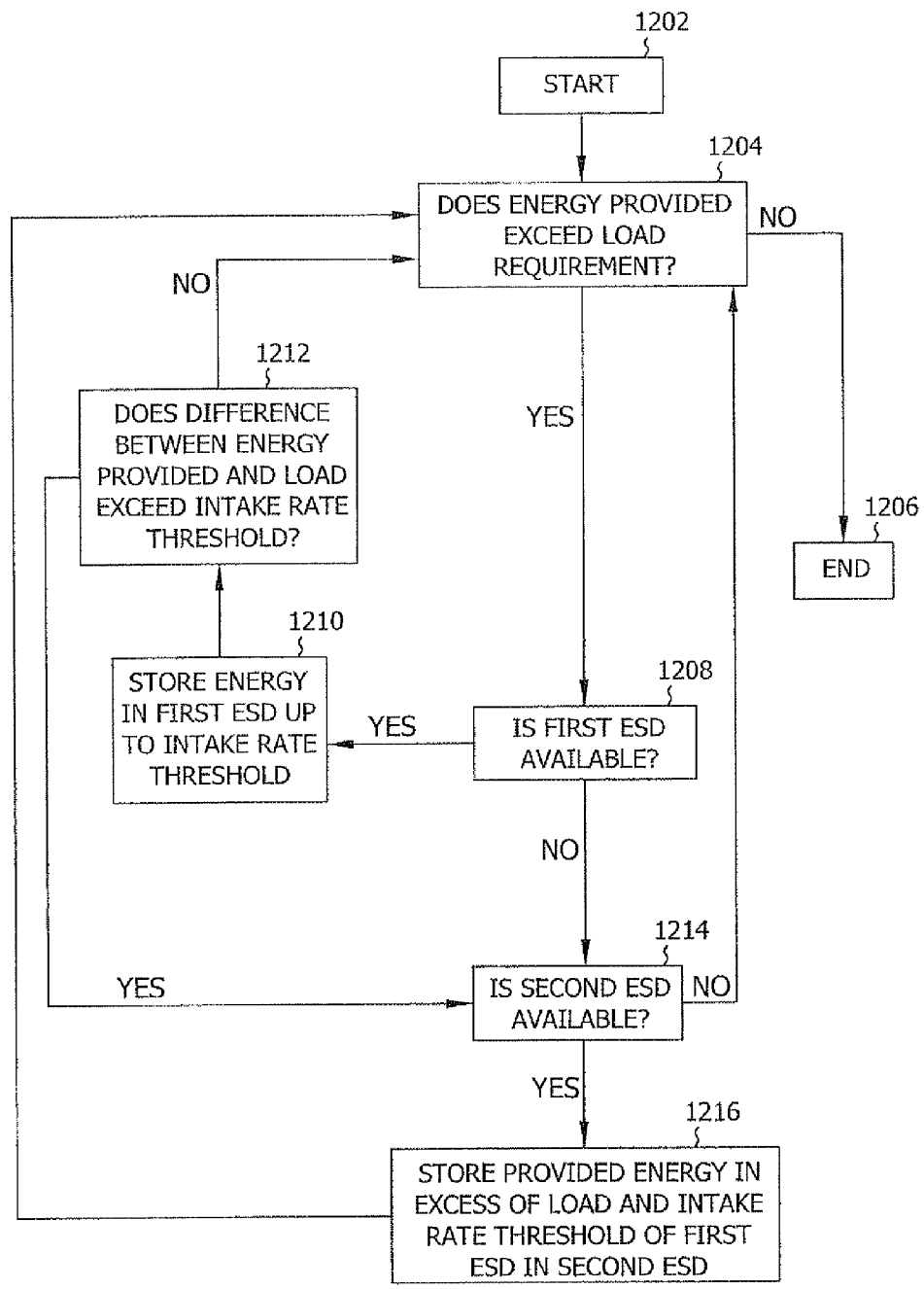
FIG. 12 is a flow diagram of one embodiment of a method of capturing power provided by an energy source in excess of an immediate energy requirement as a function of an intake rate threshold of an energy storage device.

Referring to FIG. 12, a method of capturing energy provided by the energy source 604 in excess of the immediate energy requirement of the load 602 begins at 1202. At 1204, the controller 704 determines whether the energy provided by the energy source 604 exceeds the immediate energy requirement of the load 602, and if not, the process ends at 1206. If the energy provided by the energy source 604 exceeds the immediate energy requirement of the load 602, then the controller 704 determines whether the first energy storage device 608 is available for capturing energy at 1208. If the first energy storage device 608 is available, then the controller 704 sends the appropriate signals to the energy converter 702 such that energy is captured in the first energy storage device 608 up to an intake rate threshold of the first energy storage device 608 at 1210. At 1212, the controller 704 determines whether the difference between the energy provided by the energy source 604 and the immediate energy requirement of the load 602 exceeds the intake rate threshold of the first energy storage device 608. If the difference between the energy provided by the energy source 604 and the immediate energy requirement of the load 602 does not exceed the intake rate threshold of the first energy storage device 608, then the controller 704 proceeds back to 1204. If the difference between the energy provided by the energy source 604 and the immediate energy requirement of the load 602 exceeds the intake rate threshold of the first energy storage device 608, then the controller 704 proceeds to determine whether the second energy storage device 610 is available at 1214. If the second energy storage device 610 is not available, then the controller 704 proceeds back to 1204. If the second energy storage device 610 is available, then the controller 704 sends the appropriate signals to the energy converter 702 such that the second energy storage device 610 captures the energy provided by the energy source 604 in excess of the sum of the immediate energy requirement of the load 602 and the intake rate threshold of the first energy storage device 608 at 1216, and the controller proceeds back to 1204. One skilled in the art will recognize that the method of FIG. 12 can also be applied when discharging the energy storage device 608, 610 in order to match the power output of the energy flow controller 606 to the immediate energy requirement of the load 602. In one embodiment, the controller 704 varies the intake rate threshold of the first energy storage device, the intake rate threshold of the second energy storage device, the discharge rate threshold of the first energy storage device, and the discharge rate threshold of the second energy storage device as a function of at least one of: a cooling capacity associated with the energy storage device, a heat dissipation coefficient of the energy storage device, an expected ambient air temperature profile, an expected energy requirement of the load, an expected cycle rate profile, and an energy production profile for the energy source. The controller 704 varies the intake and discharge rate thresholds as a function of this acquired, site specific data in order to maximize the efficiency of the overall system 600. One skilled in the art will recognize that the controller 704 can be configured to instantly interrupt the method of FIG. 12 in response to the immediate energy requirement of the load 602 exceeding the power provided by the energy source 604.

Figure 13:
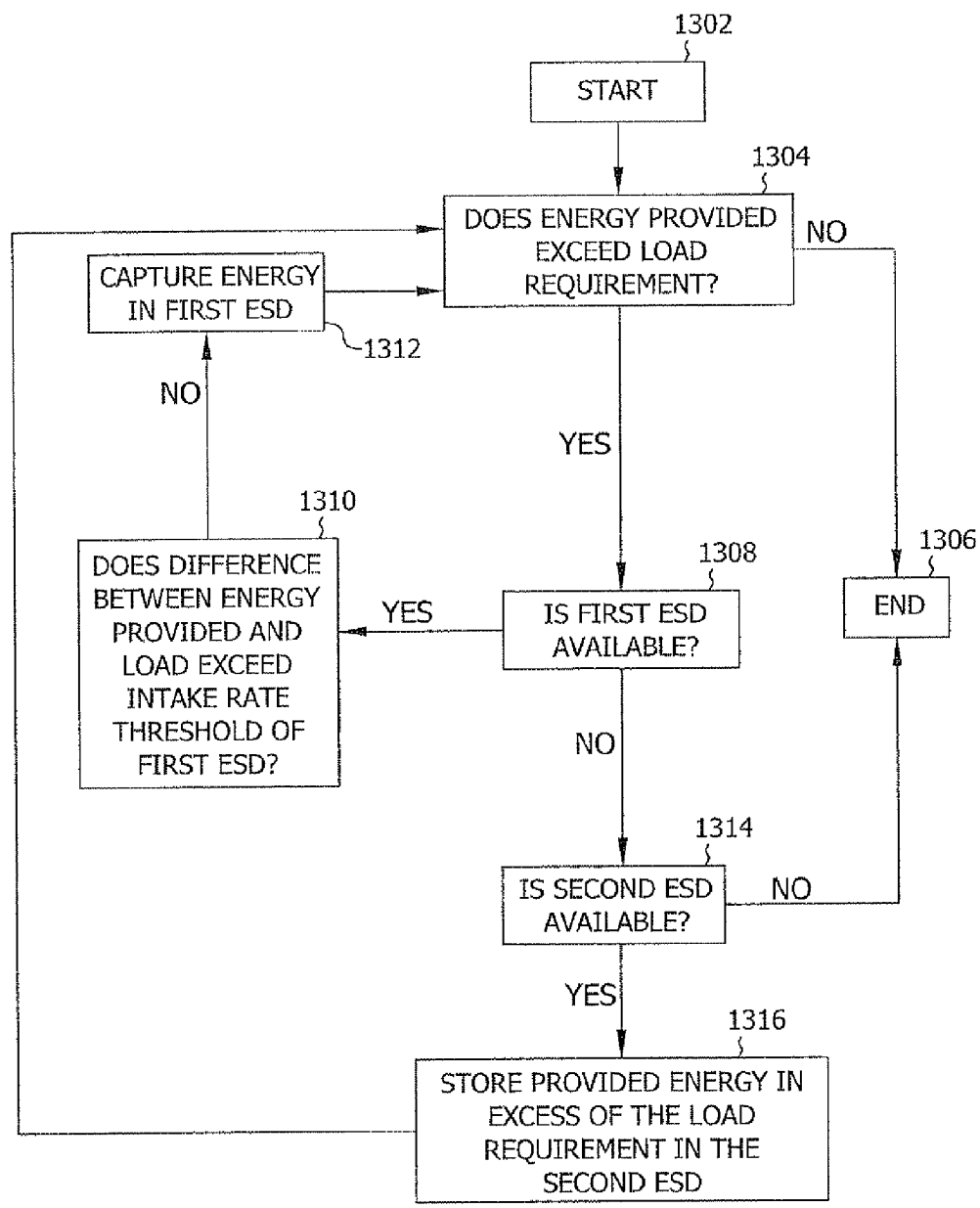
FIG. 13 is a flow diagram of another embodiment of a method of selecting an energy storage device for capturing power provided by an energy source in excess of an immediate energy requirement as a function of an intake rate threshold an energy storage device.

Referring to FIG. 13, a method of capturing energy provided by the energy source 604 in excess of the immediate energy requirement of the load 602 begins at 1302. At 1304, the controller 704 determines whether the energy provided by the energy source 604 exceeds the immediate energy requirement of the load 602, and if not, the process ends at 1306. If the energy provided by the energy source 604 exceeds the immediate energy requirement of the load 602, then the controller 704 determines whether the first energy storage device 608 is available for capturing energy at 1308. If the first energy storage device 608 is available, then the controller 704 determines whether the difference between the energy provided by the energy source 604 and the immediate energy requirement of the load 602 exceeds the intake rate threshold of the first energy storage device 608 at 1310. If not, the controller 704 sends the appropriate signals to the energy converter 702 such that energy is captured in the first energy storage device 608 at 1312 and then proceeds back to 1304. If the difference between the energy provided by the energy source 604 and the immediate energy requirement of the load 602 exceeds the intake rate threshold of the first energy storage device 608 at 1310 or the first energy storage device is not available at 1308, then the controller 704 proceeds to determine whether the second energy storage device 610 is available at 1314. If the second energy storage device 610 is not available, then the process ends at 1306. If the second energy storage device 610 is available, then the controller 704 sends the appropriate signals to the energy converter 702 such that the second energy storage device 610 captures the energy provided by the energy source 604 in excess of immediate energy requirement of the load at 1316, and the controller proceeds back to 1304. One skilled in the art will recognize that the method of FIG. 13 can also be applied when discharging the energy storage device 608, 610 in order to match the power output of the energy flow controller 606 to the immediate energy requirement of the load 602. One skilled in the art will recognize that the controller 704 can be configured to instantly interrupt the method of FIG. 13 in response to the immediate energy requirement of the load 602 exceeding the power provided by the energy source 604.

Figure 14:
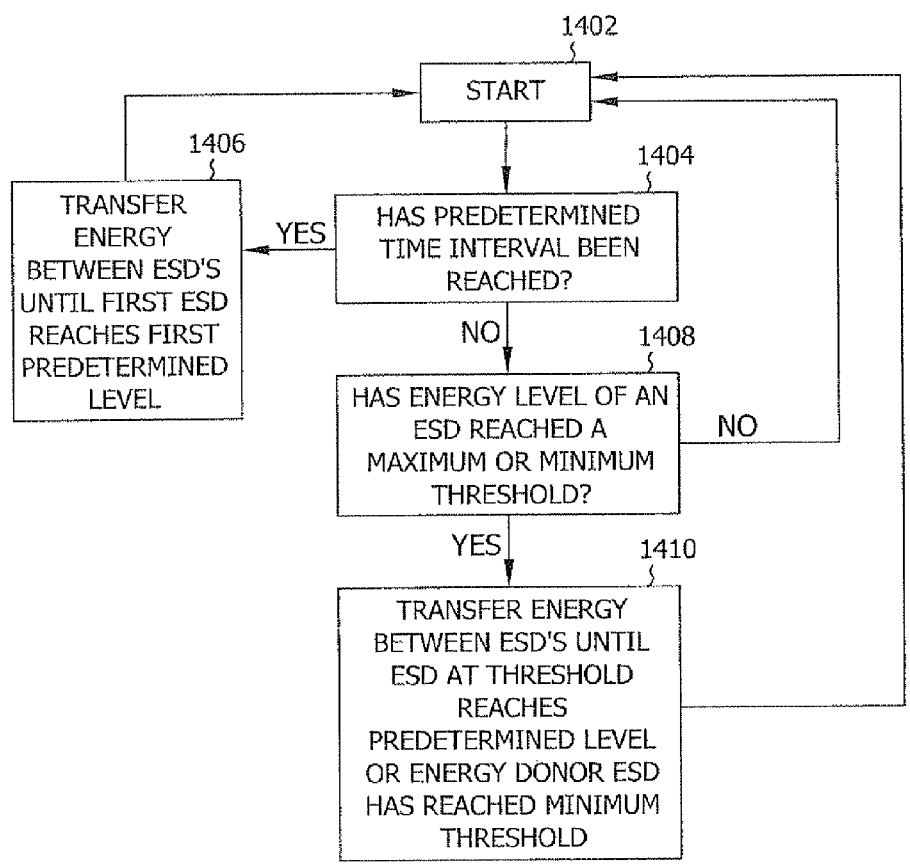
FIG. 14 is a flow diagram of one embodiment of a method of balancing stored energy between multiple energy storage devices.

Referring to FIG. 14, a method of balancing the energy levels of the first and second energy storage devices 608, 610 begins at 1402. At 1404, the controller 704 determines whether a predetermined time interval has passed. If the predetermined time interval has been reached, then at 1406, the controller 704 sends the appropriate transfer signals to the energy converter 702 such that energy is transferred between the first energy storage device 608 and second energy storage device 610 until the first energy storage device reaches a first predetermined level, and the controller proceeds back to 1402. If the predetermined time interval has not been reached, then the controller 704 proceeds to determine whether an energy level of any of the energy storage devices has reaches a maximum threshold or a minimum threshold at 1408. If not, then the processor 704 proceeds back to 1402. If so, at 1410, the processor 704 sends the appropriate signals to the energy converter 702 such that energy is transferred from an energy storage device that has reached its maximum threshold or such that energy is transferred to an energy storage device that has reached its minimum threshold. The processor 704 ceases the energy transfer when the energy storage device that had reached its maximum or minimum threshold reaches a predetermined level of the energy storage device. In one embodiment, the predetermined levels associated with each energy storage device vary as a function of an expected energy requirement profile of the load and as a function of an expected energy output profile of the energy source. That is, information is collected about the load power requirements and energy source power output over a given time period are used to adapt the energy capture and extraction algorithms in order to maximize the efficiency of the overall system 600, and the predetermined levels (i.e., first and second predetermined levels) are target states of charge (e.g., percent of capacity) for their respective energy storage devices.

Figure 15:
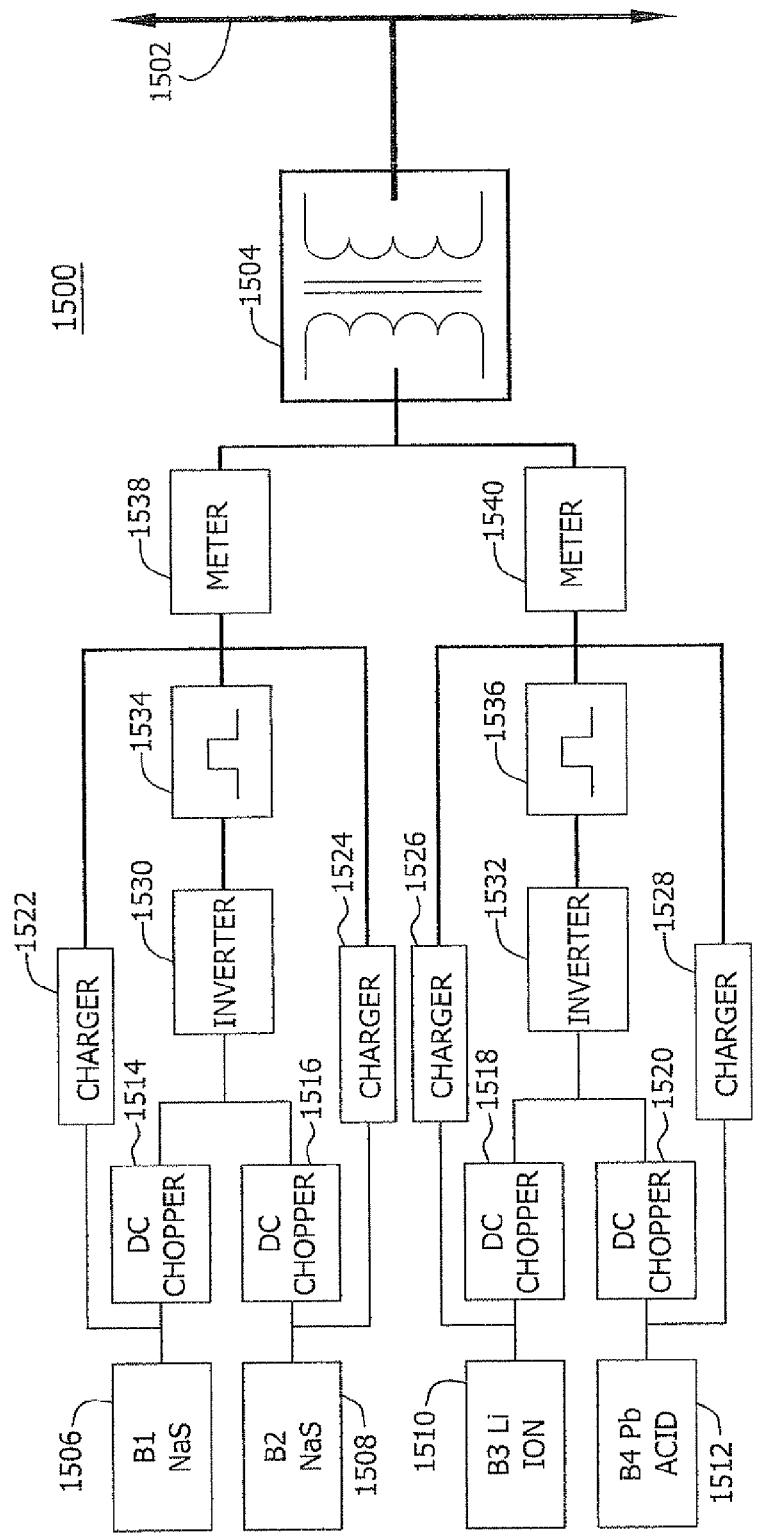
FIG. 15 is a block diagram of one embodiment of a system for stabilizing power provided from an energy source to a load.

Referring to FIG. 15, one example of a system 1500 stabilizes power provided from an energy source to a load. The system 1500 connects to a bus 1502 between the energy source and the load via a transformer 1504. In this example, the energy source is a mix of gas turbine energy and wind energy wherein the mix of wind energy varies from 15 percent to 35 percent of the supplied energy and the load varies from about 85 MW to 210 MW in total. In this example, the energy requirement profile of the load is a 24 hour profile for each season, and the energy output profile of the energy source is also a 24 hour profile for each season. As discussed above, the energy profiles are used to determine variables within the system (e.g., minimum and maximum energy levels for each energy storage device, predetermined target energy levels for each energy storage device, etc.). In this system, almost 90% of the cycles are in the range of 2 to 4 MW/minute. The transformer 1504 is a 480Y/277V-22900A 2500 kVA transformer available from a number of commercial suppliers known to one skilled in the art. The bus 1502 is 22.9 kV at approximately 60 Hz.

The system 1500 includes a first sodium sulfur battery 1506, a second sodium sulfur battery 1508, a lithium ion battery 1510, and a lead acid battery 1512. The lithium ion battery 1510 accounts for 10% of the storage capacity of this system 1500. The sodium sulfur batteries 1506 and 1508 account for 30% of the capacity of this system 1500. The lead acid battery accounts for 60% of the capacity of this system 1500. In this example, a system employing only lead acid batteries would have a 3-4 year life expectancy while this mix of storage devices provides a life expectancy of 10-15 years.

Each of the batteries has an associated direct current (DC) chopper 1514, 1516, 1518, and 1520 and an associated charger 1522, 1524, 1526, and 1528. When the system 1500 is providing energy to the bus 1502, the first and/or second DC choppers 1514 and 1516 regulate power from the first and/or second sodium sulfur batteries 1506 and 1508 to a first inverter 1530. The first inverter 1530 converts the DC power from the first and/or second DC choppers 1514 and 1516 to an alternating current (AC) 480V signal at 60 Hz. A first filter 1534 removes any harmonic noise from the 60 Hz 480V signal and provides it to a first meter 1538. The first meter 1538 monitors the flow of energy to and from the system 1500 to the bus 1502 to collect data for use in refining the algorithms determining which of the batteries to store energy in and provide energy from depending on other system conditions. Similarly, when the system 1500 is providing energy to the bus 1502, the third and/or fourth DC choppers 1518 and 1520 regulate power from the lithium ion batter 1510 and/or the lead acid battery 1512 to the second inverter 1532. The second inverter 1532 provides a 480V 60 Hz signal to the second harmonic filter 1536 which filters the signal for the second meter 1540. The energy from the first and second meters 1538 and 1540 passes through the transformer 1504 to the bus 1502.

When the system 1500 is storing energy from the bus 1502, the first and/or second meters 1538 and 1540 receive power from the transformer 1504 and provide the power to any of the first, second, third, and/or fourth chargers 1522, 1524, 1526, and 1528. Each charger converts the received 480V 60 HZ power into DC power for its respective battery. One skilled in the art will recognize that the batteries 1506, 1508, 1510, and 1512 may receive energy from their respective chargers 1522, 1524, 1526, and 1528 at different voltages and store energy at different DC voltages. Further, the chargers may be set up to provide bulk charging and individual cell charging and equalization for cells within each of their respective batteries.

In another example, a system for stabilizing energy provided by a gas turbine based power plant to a load utilizes a mix of 10% lithium ion batteries, 30% sodium sulfur batteries, and 60% lead acid batteries. In this example, the energy requirement profile of the load is a 24 hour profile for each season. Although the gas turbines generators can operate at a near constant output level, and it is optimal to do so, the immediate energy requirement of the load varies. Thus, the power plant is required to vary the output level of the gas turbine generators while keeping diesel generators on standby for any power requirement variance beyond the capability of the operating gas turbine generators. In this example, the hybrid energy storage system enables the gas turbines to operate at optimal efficiency while reducing or eliminating the need for the power plant to keep diesel generators on standby which reduces emissions and costs of the power plant.

In another example, a portable system for stabilizing energy provided by a wind turbine includes a flywheel, lithium ion batteries, and lead acid batteries. In this example, the energy requirement profile of the load may be unknown due to the portable nature of the system while the energy output profile of the energy source (i.e., wind turbine or turbines) varies on a 24 hour cycle. In one embodiment, the system learns the 24 hour energy requirement profile of the load and adjusts the control variables to optimize the energy efficiency of the system. The wind turbine may be any turbine offered by, for example, Vestas Wind Systems or General Electric Company (e.g., the V47-660 kW from Vestas Wind Systems). In this example, the system is designed for maximum energy storage density and ease of use such that it is portable and can provide constant power to a small to moderate load using renewable energy. This system can replace or augment on site power generation currently provided by small internal combustion engine generators or diesel generators. The system may also utilize solar cells to provide power to the load.

In another example, a system includes one or more large wind turbines, such as those available from Vestas Wind Systems or General Electric Company (e.g., the General Electric 2.5 MW wind turbine or the V112-3.0 MW from Vestas Wind Systems) to provide power to a factory. A factory generally has a relatively constant power usage for given period of time while the wind turbines vary in their power output. For example, the system may use a 24 hour energy requirement profile for the load that does not change with the season while using a 24 hour energy profile for the wind turbines for each season. In this example, the hybrid energy storage system comprises a flywheel array and a lead acid battery array. The flywheels operate to respond to sharp differences between power provided by the wind turbines and power required by the factory while the lead acid battery array is used to provide power to the factory during periods of low wind. The system may also have input from a power plant or be able to utilize diesel generators at the factory in case a wind outage outlast the ability of the lead acid battery array to continuously provide the power required by the factory.

In one embodiment, a method of stabilizing power provided by an energy source to a load comprises determining an intake rate threshold of each of a first and second energy storage devices and a discharge rate threshold of each of the first and second energy storage devices as a function of at least one of: a type of the energy storage device, an initial capacity of the energy storage device, an characteristic internal resistance of the energy storage device, a chemical resistance of the energy storage device, an electrolyte of the energy storage device, a temperature of the energy storage device, a state of charge of the energy storage device, a capacity loss of the energy storage device, an intake efficiency of the energy storage device, and a discharge efficiency of the energy storage device.

In one embodiment, a method of stabilizing power provided by an energy source to a load comprises varying an intake rate threshold of a first energy storage device, an intake rate threshold of a second energy storage device, a discharge rate threshold of the first energy storage device, and a discharge rate threshold of the second energy storage device as a function of at least one of: a cooling capacity associated with the energy storage device, a heat dissipation coefficient of the energy storage device, an ambient air temperature profile, an energy requirement of the load, an cycle rate profile, and an energy production profile for the energy source.

In one embodiment, a method of stabilizing power provided by an energy source to a load comprises capturing energy in one of a first energy storage device a second energy storage device and a third energy storage device. The method further comprises capturing in a third energy storage device, energy produced by the energy source in excess of an immediate energy requirement of the load if an energy level of the second energy storage device is at a second maximum threshold. The first energy storage device comprises an array of lithium based electrochemical cells. The second energy storage device comprises at least one of an array of sodium sulfuric electrochemical cells and an array of nickel cadmium electrochemical cells. The third energy storage device comprises an array of lead acid electrochemical cells. The third energy storage device has a greater energy storage capacity than the second energy storage device. The second energy storage device has a greater energy storage capacity than the first energy storage device.

In one embodiment, a system for providing power to a load comprises an energy source, a first energy storage device, a second energy storage device, and an energy flow controller comprising a power monitor, a first energy level monitor, a second energy level monitor, an energy converter, and a controller. An intake rate threshold of each of the first and second energy storage devices and a discharge rate threshold of each of the first and second energy storage devices are determined by the energy flow controller as a function of at least one of: a type of the energy storage device, an initial capacity of the energy storage device, an characteristic internal resistance of the energy storage device, a chemical resistance of the energy storage device, an electrolyte of the energy storage device, a temperature of the energy storage device, a state of charge of the energy storage device, a capacity loss of the energy storage device, an intake efficiency of the energy storage device, and a discharge efficiency of the energy storage device.

In one embodiment, a system for providing power to a load comprises an energy source, a first energy storage device, a second energy storage device, and an energy flow controller comprising a power monitor, a first energy level monitor, a second energy level monitor, an energy converter, and a controller. The energy flow controller varies an intake rate threshold of the first energy storage device, an intake rate threshold of the second energy storage device, a discharge rate threshold of the first energy storage device, and a discharge rate threshold of the second energy storage device as a function of at least one of: a cooling capacity associated with the energy storage device, a heat dissipation coefficient of the energy storage device, an ambient air temperature profile, an energy requirement of the load, an cycle rate profile, and an energy production profile for the energy source.

In one embodiment, a system for providing power to a load comprises an energy source, a first energy storage device, a second energy storage device, and an energy flow controller comprising a power monitor, a first energy level monitor, a second energy level monitor, an energy converter, and a controller. The system further comprises a third energy storage device for selectively capturing power and selectively providing captured power. The first energy storage device comprises an array of lithium based electrochemical cells. The second energy storage device comprises at least one of an array of sodium sulfuric electrochemical cells and an array of nickel cadmium electrochemical cells. The third energy storage device comprises an array of lead acid electrochemical cells. The third energy storage device has a greater energy storage capacity than the second energy storage device, and the second energy storage device has a greater energy storage capacity than the first energy storage device.

Various principles of the disclosure have been described in illustrative embodiments. However, many combinations and modifications of the above described steps, formulations, proportions, elements, materials, and components used in the practice of the invention, in addition to those not specifically described, may be varied and particularly adapted to specific environments and operating requirements without departing from those principles. Other variations and modifications of the present disclosure will be apparent to those of ordinary skill in the art, and such variations and modifications are within the scope of the invention. More particularly, the methods illustrated in FIGS. 8-14 may be used in any combination with one another.

Further, the description of various embodiments herein makes reference to the accompanying figures, which show embodiments of the invention by way of illustration and not of limitation. While these embodiments are described in sufficient detail to enable those skilled in the art to practice the invention, it should be understood that other embodiments may be realized and that logical, routine, or mechanical changes may be made without departing from the spirit and scope of the invention. Thus, the disclosure herein is presented for purposes of illustration only and not of limitation. For example, the steps recited in any of the method or process descriptions may be executed in any order and are not limited to the order presented unless otherwise specified. Moreover, any of the functions or steps may be outsourced to or performed by one or more third parties. Furthermore, any reference to a singular component may include plural components, and any reference to more than one component may include a singular component.

One skilled in the art is familiar with conventional data networking, application development and traditional electrical circuits of the systems (and components of the individual operating components of the systems) described herein, such that a detailed description of these known components, applications, and networks is unnecessary herein. Furthermore, the connecting lines shown in the various figures contained herein are intended to represent exemplary functional relationships and/or physical couplings between the various elements. It should be noted that many alternative or additional functional relationships or physical connections may be present in a practical system.

Additionally, functional blocks of the block diagrams and flowchart illustrations provided herein support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, may be implemented by either special purpose hardware-based electronics and/or computer systems which perform the specified functions or steps, or suitable combinations of special purpose hardware and computer instructions.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the invention. The scope of the invention is accordingly to be limited by nothing other than the claims that may be included in an application that claims the benefit of the present application, in which reference to an element in the singular is not intended to mean "one and only one" unless explicitly so stated, but rather "one or more." Moreover, where a phrase similar to "at least one of A, B, and C" may be used in the claims, it is intended that the phrase be interpreted to mean that A alone may be present in an embodiment, B alone may be present in an embodiment, C alone may be present in an embodiment, or that any combination of the elements A, B, and C may be present in a single embodiment; for example, A and B, A and C, B and C, or A and B and C. Although certain embodiments may have been described as a method, it is contemplated that the method may be embodied as computer program instructions on a tangible computer-readable carrier and/or medium, such as a magnetic or optical memory or a magnetic or optical disk. All structural, chemical, and functional equivalents to the elements of the above-described embodiments that are known to those of ordinary skill in the art are contemplated within the scope of this disclosure.

What is claimed:

1. A method of stabilizing power provided by an energy source to a load, the method comprising:
   capturing, in a first energy storage device, energy produced by the energy source in excess of an immediate energy requirement of the load unless an energy level of the first energy storage device is at a first maximum threshold;
   capturing, in a second energy storage device, the energy produced by the energy source in excess of the immediate energy requirement of the load if the energy level of the first energy storage device is at the first maximum threshold, unless an energy level of the second energy storage device is at a second maximum threshold; and
   varying an intake rate threshold of the first energy storage device, an intake rate threshold of the second energy storage device, a discharge rate threshold of the first energy storage device, and a discharge rate threshold of the second energy storage device as a function of at least one of: a type of the energy storage device, an initial capacity of the energy storage device, a characteristic internal resistance of the energy storage device, a chemical resistance of the energy storage device, an electrolyte of the energy storage device, a temperature of the energy storage device, a state of charge of the energy storage device, a capacity loss of the energy storage device, an intake efficiency of the energy storage device, and a discharge efficiency of the energy storage device.

2. The method of claim 1, further comprising:
   transferring energy from the first energy storage device to the second energy storage device in response to the energy level of the first energy storage device reaching the first maximum threshold; and
   ceasing transferring energy from the first energy storage device to the second energy storage device in response to the energy level of the first energy storage device reaching a first predetermined level or the energy level of the second energy storage device reaching the second maximum threshold.

3. The method of claim 1, further comprising:
   providing energy from the first energy storage device to the load when the immediate energy requirement of the load exceeds the energy produced by the energy source unless the energy level of the first storage device is at a first minimum threshold; and
   providing energy from the second energy storage device to the load when the immediate energy requirement of the load exceeds the energy produced by the energy source and the energy level of the first storage device is at the first minimum threshold, unless an energy level of the second energy storage device is at a second minimum threshold.

4. The method of claim 1, further comprising:
   transferring energy from the second energy storage device to the first energy storage device in response to the energy level of the first energy storage device reaching a first minimum threshold; and
   ceasing transferring energy from the second energy storage device to the first energy storage device in response to the energy level of the first energy storage device reaching a first predetermined level or the energy level of the second energy storage device reaching a second minimum threshold.

5. The method of claim 4, further comprising:
   transferring energy between the first energy storage device and the second energy storage device at a predetermined time interval, the transferring including
      providing energy from the first energy storage device to the second energy storage device if the energy level of the first energy storage device is greater than the first predetermined level;
      providing energy from the second energy storage device to the first energy storage device if the energy level of the first energy storage device is less than the first predetermined level; and
      ceasing providing energy from the first energy storage device to the second energy storage device or from the second energy storage device to the first energy storage device when the energy level of the first energy storage device reaches the first predetermined level or the energy level of the second storage device reaches the second minimum threshold or the second maximum threshold.

6. The method of claim 1, further comprising:
varying a first predetermined level of the first energy storage device and a second predetermined level of the second energy storage device as a function of an energy requirement profile of the load;
varying the first predetermined level of the first energy storage device and the second predetermined level of the second energy storage device as a function of an energy output profile of the energy source; and
preventing capture of energy in at least one of the first and second energy storage devices as a function of at least one of: the temperature of the energy storage device, a reduced storage or discharge efficiency of the energy storage device, a diminished capacity of the energy storage device, a number of cycles of the energy storage device, and a strain of the energy storage device.

7. The method of claim 1, wherein
the capturing, in the first energy storage device, of energy produced by the energy source in excess of the immediate energy requirement of the load further includes capturing energy in the first energy storage device in excess of the immediate energy requirement of the load up to an intake rate threshold of the energy source, and
the capturing, in the second energy storage device, of energy produced by the energy source in excess of the immediate energy requirement of the load further includes capturing energy in the second energy storage device in excess of the sum of the immediate energy requirement of the load and the intake rate threshold of the energy source.

8. The method of claim 1, further comprising:
providing energy from the first energy storage device to the load when the immediate energy requirement of the load exceeds the energy produced by the energy source up to a discharge rate threshold of the first energy storage device; and
providing energy from the second energy storage device to the load when the immediate energy requirement of the load exceeds the sum of the energy produced by the energy source and the discharge rate threshold of the first energy storage device up to a discharge rate threshold of the second energy storage device.

9. A system for providing power to a load, the system comprising:
an energy source configured to provide power;
a first energy storage device configured to selectively capture power from the energy source and selectively provide the captured power to the load;
a second energy storage device configured to selectively capture power from the energy source and selectively provide captured power to the load; and
an energy flow controller including
a power monitor configured to monitor a difference between the power provided by the energy source and an immediate energy requirement of the load and produce a power signal indicative of the monitored difference,
a first energy level monitor configured to monitor an energy level of the first energy storage device and provide a first energy level signal indicative of the energy level of the first energy storage device,
a second energy level monitor configured to monitor an energy level of the second energy storage device and provide a second energy level signal indicative of the energy level of the second energy storage device,
an energy converter configured to respond to a capture signal for converting power from the energy source into power for at least one of the first and second energy storage devices and a switch signal for directing the converted power to at least one of the first energy storage device and the second energy storage device, and
a controller configured to (i) receive the power signal, the first energy level signal, and the second energy level signal, (ii) determine from the power signal that the power provided by the energy source exceeds the immediate energy requirement of the load and provide the capture signal and the switch signal to the energy converter such that the energy provided by the energy source in excess of the immediate energy requirement of the load is captured in the first energy storage device unless the first energy level signal indicates that the energy level of the first energy storage device is at a first maximum threshold whereupon the controller alters the switch signal such that the energy converter directs the energy in excess of the immediate energy requirement of the load to the second energy storage device unless the second energy level signal indicates that the energy level of the second energy storage device is at a second maximum threshold.

10. The system of claim 9, wherein
the energy converter includes (i) a rectifier configured to convert power from the energy source into energy for storage in at least one of the first energy storage device and the second energy storage device, and (ii) an inverter configured to convert energy from at least one of the first energy storage device and the second energy storage device into power for the load.

11. The system of claim 9, wherein
the energy converter is further configured to respond to a first transfer signal from the controller for transferring energy from the first energy storage device to the second energy storage device, and
the controller is further configured to (iii) provide the first transfer signal when the first energy level signal indicates that the energy level of the first energy storage device has reached the first maximum threshold, and (iv) cease providing the first transfer signal in response to the first energy level signal indicating that the energy level of the first energy storage device has reached a first predetermined level or the second energy level signal indicating that the energy level of the second energy storage device has reached the second maximum threshold.

12. The system of claim 9, wherein
the energy converter is further configured to respond to a discharge signal for converting energy from at least one of the first and second energy storage devices into power for the load and a second switch signal for determining which of the first and second energy storage devices to convert the energy from, and
the controller is further configured to provide the discharge signal and the second switch signal to the energy converter when the power signal indicates that the immediate energy requirement of the load exceeds the energy produced by the energy source such that the energy is provided from the first energy storage device unless the first energy level signal indicates that the energy level of the first storage device is at a first minimum threshold whereupon the controller alters the switch signal such that the energy converter converts energy from the second energy storage device for the load, unless the second energy level signal indicates that the energy level of the second energy storage device is at a second minimum threshold.

13. The system of claim 12, wherein
the energy converter is further responsive to a second transfer signal for transferring energy from the second energy storage device to the first energy storage device, and
the controller is further configured to (iii) provide the second transfer signal to the energy converter in response to the first energy level signal indicating that the energy level of the first energy storage device has reached the first minimum threshold, and (iv) cease providing the second transfer signal to the energy converter in response to the first energy level signal indicating that the energy level of the first energy storage device has reached a first predetermined level or the second energy level signal indicating that the energy level of the second energy storage device has reached the second minimum threshold.

14. The system of claim 13, wherein
the controller is further configured to (iii) selectively provide one of the first transfer signal and the second transfer signal to the energy converter at a predetermined time interval, (iv) provide the first energy transfer signal if the first energy level signal indicates that energy level of the first energy storage device is greater than the first predetermined level, (v) provide the second energy transfer signal if the second energy level signal indicates that the energy level of the first energy storage device is less than the first predetermined level, and (vi) cease providing the first energy transfer signal or the second energy transfer signal when the first energy level signal indicates that the energy level of the first energy storage device has reached the first predetermined level or the second energy level signal indicates that the energy level of the second storage device has reached the second minimum threshold or the second maximum threshold.

15. The system of claim 9, wherein
the controller is further configured to (iii) vary a first predetermined level of the first energy storage device and a second predetermined level of the second energy storage device as a function of an energy requirement profile of the load, (iv) vary the first predetermined level of the first energy storage device and the second predetermined level of the second energy storage device as a function of an energy output profile of the energy source, and (v) prevent capture of energy in at least one of the first and second energy storage devices as a function of at least one of a temperature of the energy storage device, a reduced storage or discharge efficiency of the energy storage device, a diminished capacity of the energy storage device, a number of cycles of the energy storage device, and a strain of the energy storage device.

16. The system of claim 9, wherein
the energy flow controller is configured to capture energy in the first energy storage device produced by the energy source in excess of the immediate energy requirement of the load up to an intake rate threshold of the first energy storage device, and to capture energy in the second energy storage device produced by the energy source in excess of the sum of the immediate energy requirement of the load and the intake rate threshold of the first energy storage device.

17. The system of claim 9, wherein
the energy flow controller is configured to provide energy from the first energy storage device to the load when the immediate energy requirement of the load exceeds the energy produced by the energy source up to a discharge rate threshold of the first energy storage device, and to provide energy from the second energy storage device to the load when the immediate energy requirement of the load exceeds the sum of the energy produced by the energy source and the discharge rate threshold of the first energy storage device up to a discharge rate threshold of the second energy storage device.

18. A method of stabilizing power provided by an energy source to a load, the method comprising:
capturing, in a first energy storage device, energy produced by the energy source in excess of an immediate energy requirement of the load up to an intake rate threshold of the first energy storage device;
capturing, in a second energy storage device, energy produced by the energy source in excess of the sum of the immediate energy requirement of the load and the intake rate threshold of the first energy storage device; and
varying an intake rate threshold of the first energy storage device, an intake rate threshold of the second energy storage device, a discharge rate threshold of the first energy storage device, and a discharge rate threshold of the second energy storage device as a function of at least one of: a type of the energy storage device, an initial capacity of the energy storage device, a characteristic internal resistance of the energy storage device, a chemical resistance of the energy storage device, an electrolyte of the energy storage device, a temperature of the energy storage device, a state of charge of the energy storage device, a capacity loss of the energy storage device, an intake efficiency of the energy storage device, and a discharge efficiency of the energy storage device.

19. The method of claim 18, further comprising:
providing energy from the first energy storage device to the load when the immediate energy requirement of the load exceeds the energy produced by the energy source up to the discharge rate threshold of the first energy storage device; and
providing energy from the second energy storage device to the load when the immediate energy requirement of the load exceeds the sum of the energy produced by the energy source and the discharge rate threshold of the first energy storage device up to the discharge rate threshold of the second energy storage device, 20. The method of claim 18, further comprising:
varying the intake rate threshold of the first energy storage device, the intake rate threshold of the second energy storage device, the discharge rate threshold of the first energy storage device, and the discharge rate threshold of the second energy storage device further as a function of at least one of: a cooling capacity of the energy storage device, a heat dissipation coefficient of the energy storage device, an ambient air temperature profile, an energy requirement of the load, an cycle rate profile, and an energy production profile for the energy source.

* * * * *